United States Patent
Sung et al.

(10) Patent No.: US 8,735,521 B2
(45) Date of Patent: May 27, 2014

(54) CYCLOOLEFIN-BASED POLYMER COMPOUND, PREPARATION METHOD THEREOF AND SELECTIVE HYDROGENATION PROCESS

(75) Inventors: Ik Kyung Sung, Seoul (KR); Woon Sung Hwang, Seoul (KR); Jung Hoon Seo, Seoul (KR); Bun Yeoul Lee, Seoul (KR); Sung Jae Na, Yongin-si (KR); Seung Taek Yu, Seoul (KR)

(73) Assignee: Kolon Industries, Inc., Gwacheon-si (KR)

( * ) Notice: Subject to any disclaimer, the term of this patent is extended or adjusted under 35 U.S.C. 154(b) by 688 days.

(21) Appl. No.: 12/867,147

(22) PCT Filed: Feb. 11, 2009

(86) PCT No.: PCT/KR2009/000650
§ 371 (c)(1),
(2), (4) Date: Nov. 2, 2010

(87) PCT Pub. No.: WO2009/102150
PCT Pub. Date: Aug. 20, 2009

(65) Prior Publication Data
US 2011/0054131 A1    Mar. 3, 2011

(30) Foreign Application Priority Data

Feb. 12, 2008  (KR) .................. 10-2008-0012749
Feb. 11, 2009  (KR) .................. 10-2009-0010910
Feb. 11, 2009  (KR) .................. 10-2009-0010911

(51) Int. Cl.
*C08F 232/08*    (2006.01)
*C08F 210/02*    (2006.01)
*C08F 4/642*    (2006.01)
*C08F 4/646*    (2006.01)
*C08F 4/649*    (2006.01)
*C07C 5/05*    (2006.01)
*C07F 15/00*    (2006.01)

(52) U.S. Cl.
USPC .............. 526/281; 526/75; 526/134; 526/153; 526/160; 526/161; 526/172; 585/273; 585/360; 556/136

(58) Field of Classification Search
USPC ........... 526/75, 160, 161, 281, 134, 153, 172; 556/136; 585/273, 360
See application file for complete search history.

(56) References Cited

U.S. PATENT DOCUMENTS 7,078,577 B2 * 7/2006 Webber .................. 585/275

OTHER PUBLICATIONS

Hermann, et al, "Metal Complexes of N-Heterocyclic Carbenes—A New Structural Principle for Catalysts in Homogeneous Catalysis," Agnew. Chem. Int. Ed. Engl., 1995, 34, 2371-2374.*
Wurtz, et al, "Surveying Sterically Demanding N-Heterocyclic Carbene Ligands with Restricted Flexibility for Palladium-catalyzed Cross-Coupling Reactions," Acc. Chem. Res., 2008, 41, 1523-1533.*
Na, et al, "Copolymerization of 5,6-Dihydrodicyclopentadiene and Ethylene," Macromolecules 2008, 41, 4055-4057.*
Marion, et al, "Modified (NHC)Pd(allyl)Cl . . . Complexes for Room-Temperature Suzuki-Miyaura and Buchwald-Hartwig Reactions," J. Am. Chem. Soc. 2006, 128, 4101-4111.*

* cited by examiner

*Primary Examiner* — Fred M Teskin
(74) *Attorney, Agent, or Firm* — Sughrue Mion, PLLC

(57) ABSTRACT

A cycloolefin-based copolymer and a hydrogenation process are disclosed, wherein the cycloolefin-based copolymer is prepared by using: a monomer which can be easily and economically obtained by hydrogenating dicyclopentadiene that occupies much of C5 fractions from naphtha cracking; or a monomer which can be obtained by chemically bonding three molecules of cyclopentadiene via Diels-Alder reactions and then hydrogenating the cyclopentadiene. The copolymer can be used in various fields as an amorphous transparent resin.

11 Claims, 16 Drawing Sheets

CYCLOOLEFIN-BASED POLYMER COMPOUND, PREPARATION METHOD THEREOF AND SELECTIVE HYDROGENATION PROCESS

BACKGROUND OF THE INVENTION

1. Field of the Invention

The present invention relates to a cycloolefin-based polymer compound and a method of preparing the same. More particularly, the present invention relates to a cycloolefin-based copolymer which is prepared from a monomer which may be easily and economically obtained by hydrogenating dicyclopentadiene that occupies much of C5 fractions from naphtha cracking or a monomer which may be obtained by chemically bonding three molecules of cyclopentadiene using a Diels-Alder reaction and then hydrogenating the cyclopentadiene, and to a hydrogenation process.

2. Description of the Related Art

Whereas C4 or less fractions from naphtha cracking are separated and purified and are thus useful in the petroleum industry, C5-fractions thereof are mostly burned and used as fuel and only a little thereof is separated and purified and thus industrially applied by some manufacturers. Hence, thorough research into the separation and purification of C5-fractions so as to prepare high value-added chemical products is ongoing.

In particular, cyclopentadiene occupies much of C5-fractions. Cyclopentadiene spontaneously undergoes a Diels-Alder reaction at room temperature and is thus converted into dicyclopentadiene. In order to manufacture plastics from dicyclopentadiene, copolymerization of dicyclopentadiene with ethylene, alpha-olefin or styrene is under active study (Scheme 1). Dicyclopentadiene has two olefin groups, of which the olefin group of carbons at the 5-6 positions is known to be more greatly reactive than the olefin group of carbons at the 2-3 positions. Upon copolymerization of dicyclopentadiene with a vinyl monomer using a polymerization catalyst, the olefin group of carbons at the 5-6 positions first reacts and thus a polymer at the intermediate step of Scheme 1 is obtained, but the reaction does not typically stop at this step and is further carried out and thus the olefin group of carbons at the 2-3 positions, which remain in the polymer, additionally participates in the polymerization, resulting in a crosslinked polymer (Naga, N. *J. Polym. Sci., Part A: Polym. Chem.* 2005, 43, 1285-1291). However, the crosslinked polymer is difficult to process and limitations are imposed on developing the end uses thereof.

Group IV metallocene catalysts were reported to enable the preparation of the uncrosslinked polymer at the intermediate step of Scheme 1 provided that the amount of dicyclopentadiene was adjusted to be less than 10% (Simanke, A. G.; Mauler, R. S.; Galland, G. B. *J. Polym. Sci., Part A: Polym. Chem.* 2002, 40, 471-485; Suzuki, J.; Kino, Y.; Uozumi, T.; Sano, T.; Teranishi, T.; Jin, J.; Soga, K.; Shiono, T. *J. Appl. Polym. Sci.* 1999, 72, 103-108). Recently, group III metal-based catalysts have been reported to enable the preparation of copolymers including dicyclopentadiene in a large amount because only the olefin group of carbons at the 5-6 positions is reactive and the olefin group of carbons at the 2-3 positions is not reactive (Journal of Organometallic Chemistry 691 (2006) 3114-3121; Xiaofang Li and Zhaomin Hou, *Macromolecules* 2005, 38, 6767-6769; Xiaofang Li, Masayoshi Nishiura, Kyouichi Mori, Tomohiro Mashiko and Zhaomin Hou, *Chem. Commun.*, 2007, 4137-4139). However, because such polymers have an olefin group that is unreactive to the molecular structure, they are problematic in terms of direct commercial use. An olefin group having high reactivity may cause the deformation of resins upon melting and may decrease durability. For these reasons, the use of resins of the polymer chain including the olefin group is not common in the industrial world.

Resins resulting from hydrogenating linear polymers produced via ring-opening metathesis polymerization (ROMP) of the olefin group of carbons at the 5-6 positions of dicyclopentadiene as shown in Scheme 2 below have been produced in the market by Zeon, Japan (Masahiro Yamazaki, *Journal of Molecular Catalysis A: Chemical* 213 (2004) 81-87). In this case, it is necessary to completely remove the double bonds of the resin by hydrogenation. However, it is not easy to hydrogenate all of the double bonds into single bonds for polymer compounds having olefin groups.

(Scheme 1)

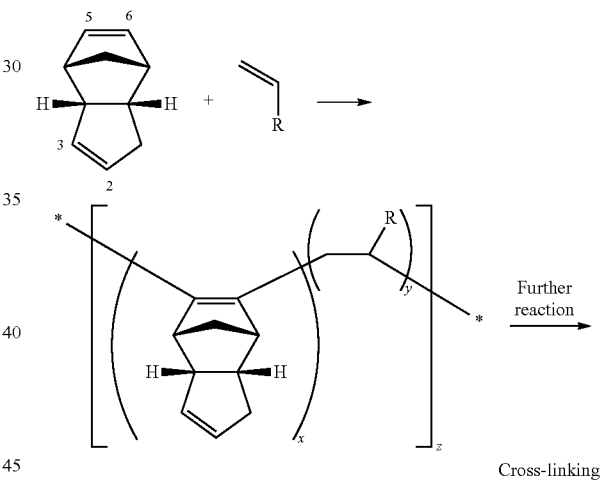

(Scheme 2)

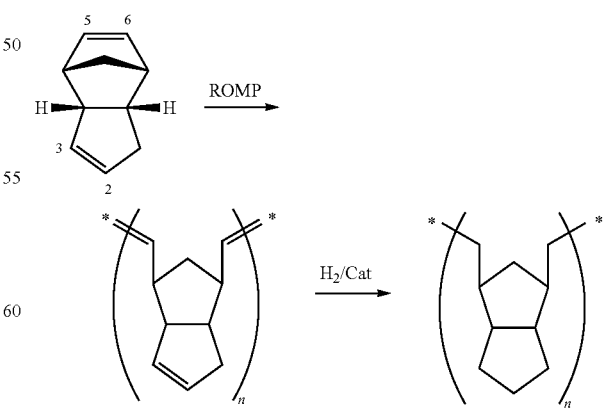

On the other hand, dicyclopentadiene may be converted into cyclopentadiene at high temperature, and then subjected to a Diels-Alder reaction with ethylene or alpha-olefin thus preparing a norbornene-based cycloolefin which may then be copolymerized with ethylene (Cho, E. S.; Joung, U. G.; Lee, B. Y.; Lee, H.; Part, Y.-W.; Lee, C. H.; Shin, D. M. *Organometallics* 2004, 23, 4693-4699; Lee Si-Geun, Park Yeong-Hwan, Hong Seong-Don, Song Gwang-Ho, Jeong Bung-Gun, Nam Dae-U, Lee Bun-Yeoul, Korean Patent No. 10-0458600 (2004. 11. 16); Incoronata Tritto, Laura Boggioni, Dino R. Ferro, Coordination Chemistry Reviews 250 (2006) 212-241). The copolymer thus prepared is called a cycloolefin copolymer (COC) (Scheme 3). As represented in the bottom of Scheme 3, the norbornene-based monomer may also be prepared into a resin by ROMP and then hydrogenation (Mashahiro Yamazaki, *Journal of Molecular Catalysis A: Chemical* 213 (2004) 81-87). The polymer thus obtained is referred to as a cycloolefin polymer (COP). Due to the reasons it is difficult to hydrogenate the polymer compound mentioned above, the cycloolefin copolymer (COC) is more favorable in terms of preparation process than is the cycloolefin polymer (COP). Furthermore, when the ratio of ethylene and norbornene of COC is adjusted, the glass transition temperature (Tg) of the resin may be controlled, making it possible to prepare products of various grades, and also, COC is advantageous because of high transparency, low birefringence, and low resin density, and thus the end use thereof has been developed in fields including packaging materials of food and medicines, DVD materials, and optical films for displays.

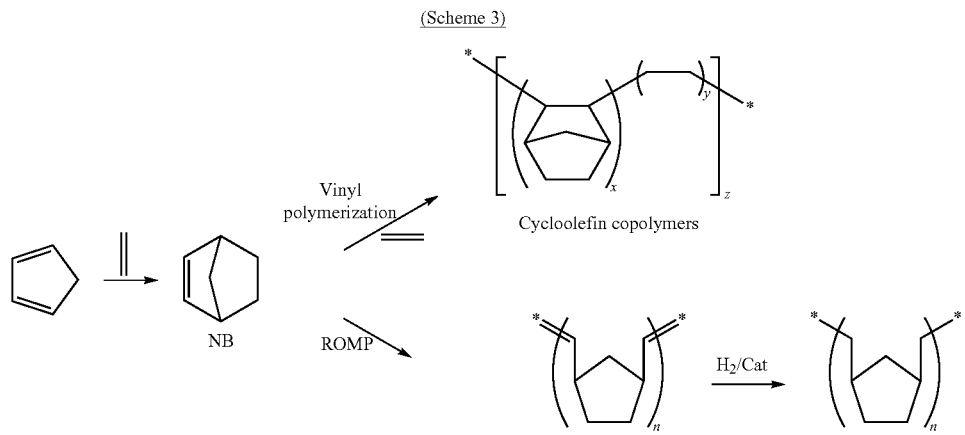

(Scheme 3)

However, because COC resins prepared using norbornene comprise a large amount of norbornene monomer, high-Tg resin grades are brittle and thus unsuitable for use in optical films. With the goal of overcoming drawbacks of the properties of COC resins generally prepared from norbornene including the above problems, attempts have been made to use, as a COC monomer, a bulky cycloolefin compound such as 1,4,5,8-dimethano-1,2,3,4,4a,5,8,8a-octahydronaphtalene (hereinafter, abbreviated as "DMON") obtained by subjecting norbornene once more to a Diels-Alder reaction with cyclopentadiene (Scheme 4; W. Kaminsky, Catalysis Today 62 (2000) 23-34). In order to improve the properties of COP, a lot of effort is directed to the preparation of resins by ROMP and hydrogenation of DMON as represented in the bottom of Scheme 4 (Masahiro Yamazaki, *Journal of Molecular Catalysis A: Chemical* 213 (2004) 81-87). The use of a bulky cycloolefin monomer upon synthesis of COC enables a high-Tg resin to be prepared from a polymer including ethylene in a comparatively larger amount than when using norbornene to prepare COC. The problems related to brittleness noted above may be overcome because the polymer chain includes more of the flexible ethylene monomer than it does the cycloolefin monomer. However, as shown in Scheme 4, DMON which is prepared via two steps from dicylcopentadiene is problematic because its preparation process is not easy, and thus it is considerably expensive and unsuitable for use as a polymeric monomer. Hence, the economic preparation of DMON is currently regarded as important to the commercialization of DMON-based resins.

(Scheme 4)

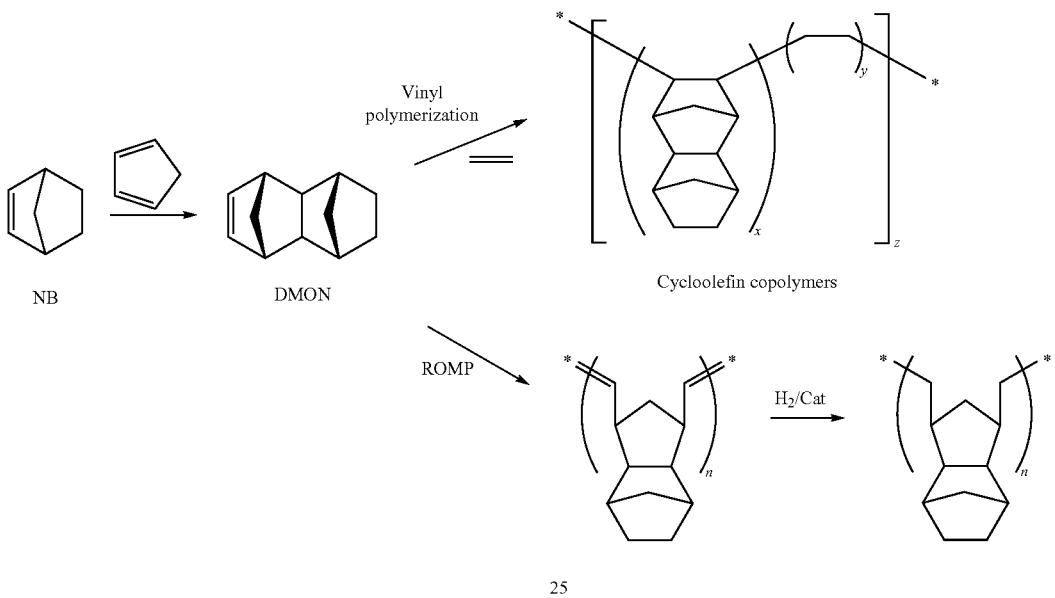

Furthermore, the polymer material at the bottom of Scheme 4 was commercialized by Zeon.

On the other hand, cyclopentadiene is a material that occupies much of C5 fractions. Cyclopentadiene (CPD) spontaneously undergoes a Diels-Alder reaction at room temperature and is thus converted into dicyclopentadiene (DCPD). Additionally, dicyclopentadiene may be further subjected to a Diels-Alder reaction with cyclopentadiene, thus preparing tricyclopentadiene (TCPD). These reactions may continue, and thus the use thereof to prepare resins is possible in the industrial world (Scheme 5, Chemical Engineering Science 56 (2001) 927-935).

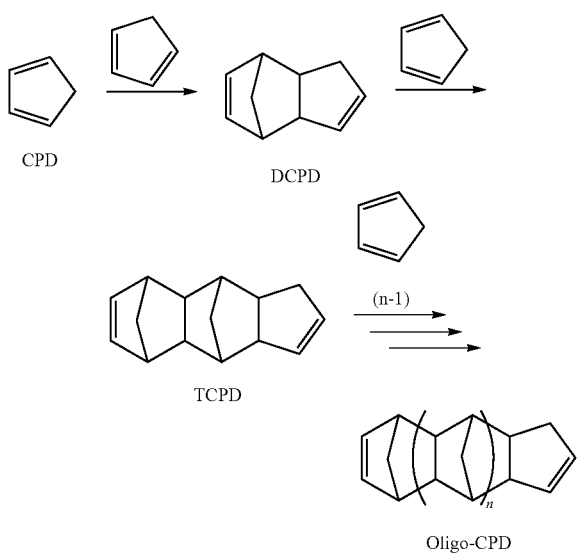

Such cyclopentadiene (CPD) Diels-Alder reaction products have two olefin groups. One olefin group is in the form of a norbornene compound (hereinafter, referred to as "norbornene-type olefin"), and the other olefin group is in the form of cyclopentene (hereinafter, referred to as "cyclopentene-type olefin"). Typically, of two olefin groups, norbornene-type olefin is known to be the more reactive. There were reported methods of preparing 5,6-dihydrodicyclopentadiene by selectively hydrogenating only the norbornene-type olefin among two olefin groups of dicyclopentadiene using a difference in reactivity between two olefin groups.

For example, synthesis of 5,6-dihydrodicyclopentadiene via selective hydrogenation of dicyclopentadiene using a commercially available Pd/alumina or Pd/C catalyst is disclosed in U.S. Pat. No. 7,078,577, *Inorg. Chem.* 1999, 38, 2359 and *J. Org. Chem.* 1991, 56, 6043. In order to attain the hydrogenation selectivity in the presence of such a catalyst, hydrogen is essentially required to be added in an equivalent quantity. Because the norbornene-type olefin group among the two olefin groups has a faster reaction rate in the presence of the above catalyst, it is first hydrogenated. If hydrogen is added in an amount above the equivalent quantity, the cyclopentene-type olefin group having a slow reaction rate may also be hydrogenated, so that tetrahydrodicyclopentadiene is formed as a by-product. Specifically, because selectivity is adjusted by the reaction rate, even when a continuous process is developed in consideration of reaction conditions sensitively affecting the selectivity and thus the reaction conditions are efficiently controlled, it is inevitable that unreacted dicyclopentadiene remains to some degree (<0.3%), and a by-product tetrahydrodicyclopentadiene is formed in an amount of 3% or more.

Moreover, results of selectively hydrogenating dicyclopentadiene using, as a catalyst, nickel metal obtained by reducing nickel acetate with $NaBH_4$ within a reactor were reported in Tetrahedron Letters 2007, 48, 8331. Even in this case, hydrogen was added in 1.1 equivalents in order to attain the selectivity, and the reaction product was purified using recrystallization in order to remove the by-product tetrahydrodicyclopentadiene. Also, results of selective hydrogenation of tricyclopentadiene using, as a catalyst, nickel metal obtained by reducing nickel acetate with $NaBH_4$ within a reactor were reported in *J. C. S. Perkin I*, 1977, 19. Even in this case, hydrogen was added in 1 equivalent in order to attain the selectivity, and 0.360 g of nickel acetate was used to hydrogenate 1.5 g of tricyclopentadiene but its catalytic activity was inappropriately low for commercial use.

SUMMARY OF THE INVENTION

Accordingly, the present invention is intended to provide a cycloolefin-based polymer compound which is prepared from a monomer obtainable using a simple process and is able to exhibit properties equal to those of conventional cycloolefin-based polymer compounds obtained from DMON.

Also the present invention is intended to provide a method of preparing a cycloolefin-based polymer compound by vinyl polymerizing a monomer obtainable using a simple process.

In particular, the present invention is intended to provide a cycloolefin-based polymer compound having high Tg.

Also the present invention is intended to provide a method of selectively hydrogenating only the norbornene-type olefin group of dicyclopentadiene, tricyclopentadiene and similar cyclopentadiene Diels-Alder reaction products using a predetermined palladium compound catalyst.

Also the present invention is intended to provide a catalyst which has no hydrogenation reactivity to one olefin group and has hydrogenation reactivity only to the other olefin group in a compound having two olefin groups having different reactivities, like dicyclopentadiene, tricyclopentadiene and similar cyclopentadiene Diels-Alder reaction products.

An embodiment of the present invention provides a cycloolefin-based polymer compound comprising a repeating unit represented by Formula 1 below.

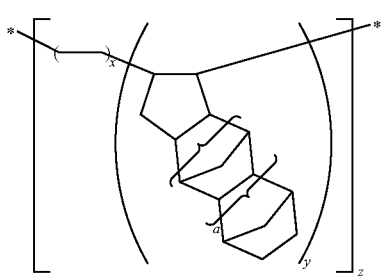

Formula 1 wherein a is 0 or 1, the molar ratio of x:y ranges from 99:1 to 1:99, and z has an average value of 10~20,000.

Specifically, the cycloolefin-based polymer compound may comprise a repeating unit represented by Formula 2 below.

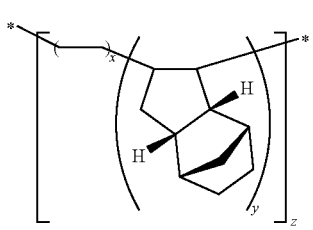

Formula 2

Also specifically, the cycloolefin-based polymer compound may comprise a repeating unit represented by Formula 7 below.

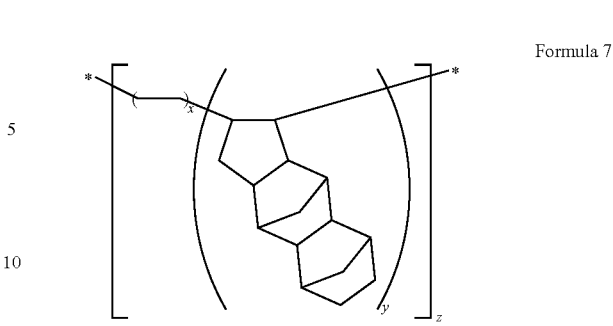

Formula 7

In the cycloolefin-based polymer compound according to the embodiment of the present invention, the molar ratio of x:y may range from 90:10 to 50:50, and z may have an average value of 500~3000.

The cycloolefin-based polymer compound according to the embodiment of the present invention comprising the repeating unit represented by Formula 2 may further comprise a repeating unit represented by Formula 4 below, wherein a molar ratio of x:(y+o) may range from 10:90 to 90:10.

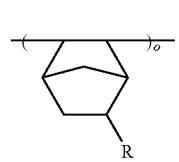

Formula 4 wherein R is a hydrogen atom, a C1~6 alkyl group or a phenyl group. As such, R may be a hydrogen atom.

Another embodiment of the present invention provides a method of preparing a cycloolefin-based polymer compound comprising a repeating unit represented by Formula 1 below, comprising vinyl polymerizing a compound represented by Formula 3 below or a compound represented by Formula 8 below with ethylene, in the presence of a catalyst formed by activating a compound represented by Formula 6 below using a co-catalyst comprising one or more selected from among methylaluminoxane obtained by partially hydrolyzing trimethylaluminum alone or a mixture of trimethylaluminum and triisobutylaluminum, $Al(R^3)_3$ (wherein $R^3$ which are the same or different are a halogen radical or a C1~20 hydrocarbyl radical), $B(Ar_f)_3$ (wherein $Ar_f$ is a fluorine atom-substituted aryl group), and $[L]^+[B(Ar_f)_4]^-$ (wherein $Ar_f$ is defined as above, and $[L]^+$ is a carbocation or tert-ammonium).

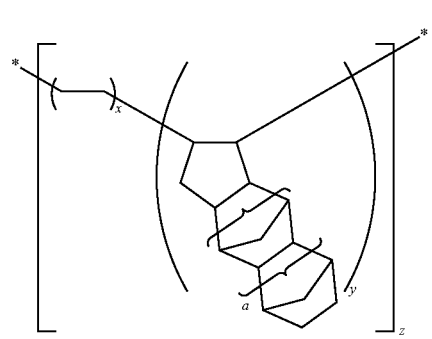

Formula 1 wherein a is 0 or 1, a molar ratio of x:y ranges from 99:1 to 1:99, and z has an average value of 10~20,000.

Formula 3

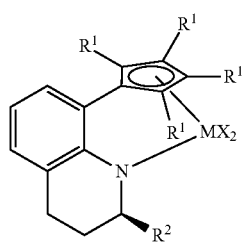
Formula 6 wherein M is Ti, Zr or Hf; X is halogen or a C1~20 alkyl group; R[1] which are the same or different are a hydrogen radical, a C1~20 alkyl group, an alkenyl group or an alkynyl group; and R[2] which are the same or different are a hydrogen radical, a C1~20 alkyl group, an alkenyl group or an alkynyl group.

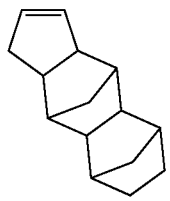
Formula 8

In the method according to the embodiment of the present invention, the compound represented by Formula 3 and a compound represented by Formula 5 below may be reacted with ethylene.

Formula 5 wherein R is a hydrogen atom, a C1~6 alkyl group or a phenyl group.

In the method according to the embodiment of the present invention, in the compound represented by Formula 6, M is Ti, X is a methyl group or a chlorine radical, and both R[1] and R[2] are a methyl group; in Al(R[3])$_3$, R[3] is a methyl group, an ethyl group or an isobutyl group; in B(Ar$_f$)$_3$, Ar$_f$ is pentafluorophenyl (C$_6$F$_5$); and in [L]$^+$[B(Ar$_f$)$_4$] Ar$_f$ is pentafluorophenyl (C$_6$F$_5$) and [L]$^+$ is [Ph$_3$C]$^+$ or [PhNMe$_2$H]$^+$.

In the method according to the embodiment of the present invention, the compound represented by Formula 3 or the compound represented by Formula 8 may be obtained by selectively hydrogenating the olefin group of a compound represented by Formula 9 below using an N-heterocyclic-carbene-coordinated palladium compound as a catalyst.

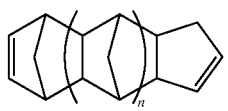
Formula 9

(wherein n=0 or 1).

In the method according to the embodiment of the present invention, the N-heterocyclic-carbene-coordinated palladium compound may comprise a compound represented by Formula 10 below.

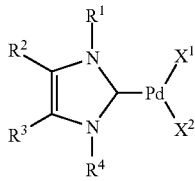
Formula 10 wherein R[1] and R[4] are independently selected from among C1~20 alkyl and C6~30 aryl groups substituted or unsubstituted with a hetero atom including N, O or S; R[2] and R[3] are independently selected from among a hydrogen atom, and C1~20 alkyl and C6~30 aryl groups substituted or unsubstituted with a hetero atom including N, O or S; X[1] and X[2] are independently selected from among a halogen ligand, a substituted or unsubstituted allyl ligand, and a carboxylate ligand, or selected from among an olefin ligand and a solvent ligand; and two compounds are able to be present in dimeric form.

In particular, in the method according to the embodiment of the present invention, the compound represented by Formula 10 may be a compound in which both R[1] and R[4] are 2,6-diisopropylphenyl (2,6-iPr$_2$C$_6$H$_3$—); both R[2] and R[3] are a hydrogen atom; and both X[1] and X[2] are chlorine or acetate, in which case two compounds are able to be present in dimeric form, or one of X[1] and X[2] is chlorine and the other is allyl.

A further embodiment of the present invention provides a method of preparing a compound represented by Formula 12 below, comprising selectively hydrogenating the olefin group of a compound represented by Formula 11 below using an N-heterocyclic-carbene-coordinated palladium compound as a catalyst.

Formula 11

(wherein n = 0~10)

Formula 12

(wherein n = 0~10)

Specifically, the compound represented by Formula 11 and the compound represented by Formula 12 may be a compound in which n is 0 or 1.

In the preparation method according to the embodiment of the present invention, the N-heterocyclic-carbene-coordinated palladium compound may comprise a compound represented by Formula 10 below.

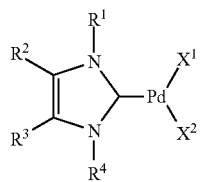

Formula 10 wherein $R^1$ and $R^4$ are independently selected from among C1~20 alkyl and C6~30 aryl groups substituted or unsubstituted with a hetero atom including N, O or S; $R^2$ and $R^3$ are independently selected from among a hydrogen atom, and C1~20 alkyl and C6~30 aryl groups substituted or unsubstituted with a hetero atom including N, O or S; $X^1$ and $X^2$ are independently selected from among a halogen ligand, a substituted or unsubstituted allyl ligand, and a carboxylate ligand, or selected from among an olefin ligand and a solvent ligand; and two compounds are able to be present in dimeric form.

In the preparation method according to the embodiment of the present invention, the compound represented by Formula 10 may be a compound in which both $R^1$ and $R^4$ are 2,6-diisopropylphenyl (2,6-iPr$_2$C$_6$H$_3$—); both $R^2$ and $R^3$ are a hydrogen atom; and both $X^1$ and $X^2$ are chlorine or acetate, in which case two compounds are able to be present in dimeric form, or one of $X^1$ and $X^2$ is chlorine and the other is allyl.

Still another embodiment of the present invention provides a catalyst comprising an N-heterocyclic-carbene-coordinated palladium compound so that only one olefin group of a compound having two olefin groups having different reactivities is selectively hydrogenated.

As such, the compound having two olefin groups having different reactivities may be represented by Formula 11 below.

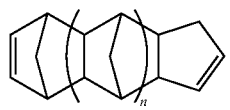

Formula 11

(wherein n = 0~10)

Furthermore, the compound having two olefin groups having different reactivities may be a compound of Formula 11 in which n is 0 or 1.

According to a specific embodiment, an N-heterocyclic-carbene-coordinated palladium compound may comprise a compound represented by Formula 10 below.

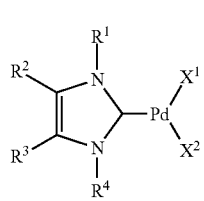

Formula 10 wherein $R^1$ and $R^4$ are independently selected from among C1~20 alkyl or C6~30 aryl groups substituted or unsubstituted with a hetero atom including N, O or S; $R^2$ and $R^3$ are independently selected from among a hydrogen atom, and C1~20 alkyl or C6~30 aryl groups substituted or unsubstituted with a hetero atom including N, O or S; $X^1$ and $X^2$ are independently selected from among a halogen ligand, a substituted or unsubstituted allyl ligand, and a carboxylate ligand, or selected from among an olefin ligand and a solvent ligand; and two compounds are able to be present in dimeric form.

As such, the compound represented by Formula 10 may be a compound in which both $R^1$ and $R^4$ are 2,6-diisopropylphenyl (2,6-iPr$_2$C$_6$H$_3$—); both $R^2$ and $R^3$ are a hydrogen atom; and both $X^1$ and $X^2$ are chlorine or acetate, in which case two compounds are able to be present in dimeric form, or one of $X^1$ and $X^2$ is chlorine and the other is allyl.

According to an embodiment of the present invention, there are provided newly structured cycloolefin copolymers, such as 5,6-dihydrodicyclopentadiene-ethylene copolymer or 5,6-dihydrodicyclopentadiene-(norbornene-based cycloolefin or cyclopentene)-ethylene terpolymer, using 5,6-dihydrodicyclopentadiene which may be easily and economically prepared by hydrogenating dicyclopentadiene that occupies much of C5 fractions from naphtha cracking, and preparation methods thereof. Thereby, the cycloolefin-based polymer compound having superior properties may be provided using a simpler method than conventionally known methods of preparing cycloolefin-based polymer compounds. The cycloolefin-based polymer compound thus obtained can be expected to be useful in fields including packaging materials for food and medicines, DVD materials, optical films for displays and so on.

In addition, according to an embodiment of the present invention, dihydrotricyclopentadiene is used as a new cycloolefin monomer to be copolymerized with ethylene. The resulting copolymer may exhibit Tg to the same extent as do typical cycloolefin copolymers such as norbornene-ethylene copolymers, even when the polymer chain includes a dihydrotricyclopentadiene monomer in comparatively small amount (or an ethylene monomer in a comparatively large amount). Also, as the polymer chain having high Tg includes an ethylene monomer in a comparatively large amount, it is more flexible and thus may alleviate the drawbacks of conventional norbornene-ethylene copolymers.

In addition, in the present invention, when an N-heterocyclic-carbene-coordinated palladium compound is used as a hydrogenation catalyst, among norbornene- and cyclopentene-type olefin groups of dicyclopentadiene, tricyclopentadiene and similar cyclopentadiene Diels-Alder reaction products, the above catalyst particularly has hydrogenation reactivity only to the norbornene-type olefin group, without reactivity to the cyclopentene-type olefin group, so that hydrogenated compounds may be prepared at high yield and high purity in various solvents without purification of by-products, regardless of excessive addition of hydrogen or hydrogen pressure upon hydrogenation.

DESCRIPTION OF SPECIFIC EMBODIMENTS

Figure 1:
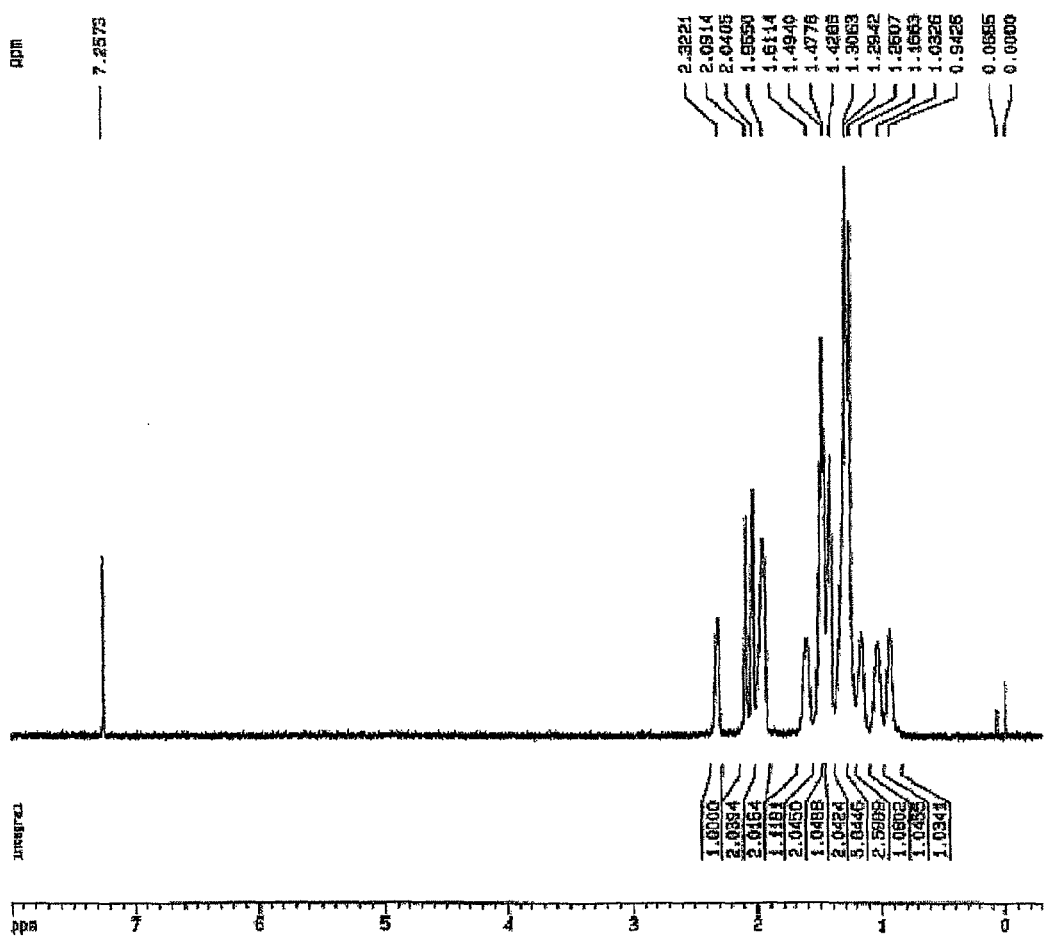
FIG. 1 shows a $^1$H NMR spectrum of a 5,6-dihydrodicyclopentadiene/ethylene copolymer (which is obtained at an ethylene pressure of 20 psig)
Figure 2:
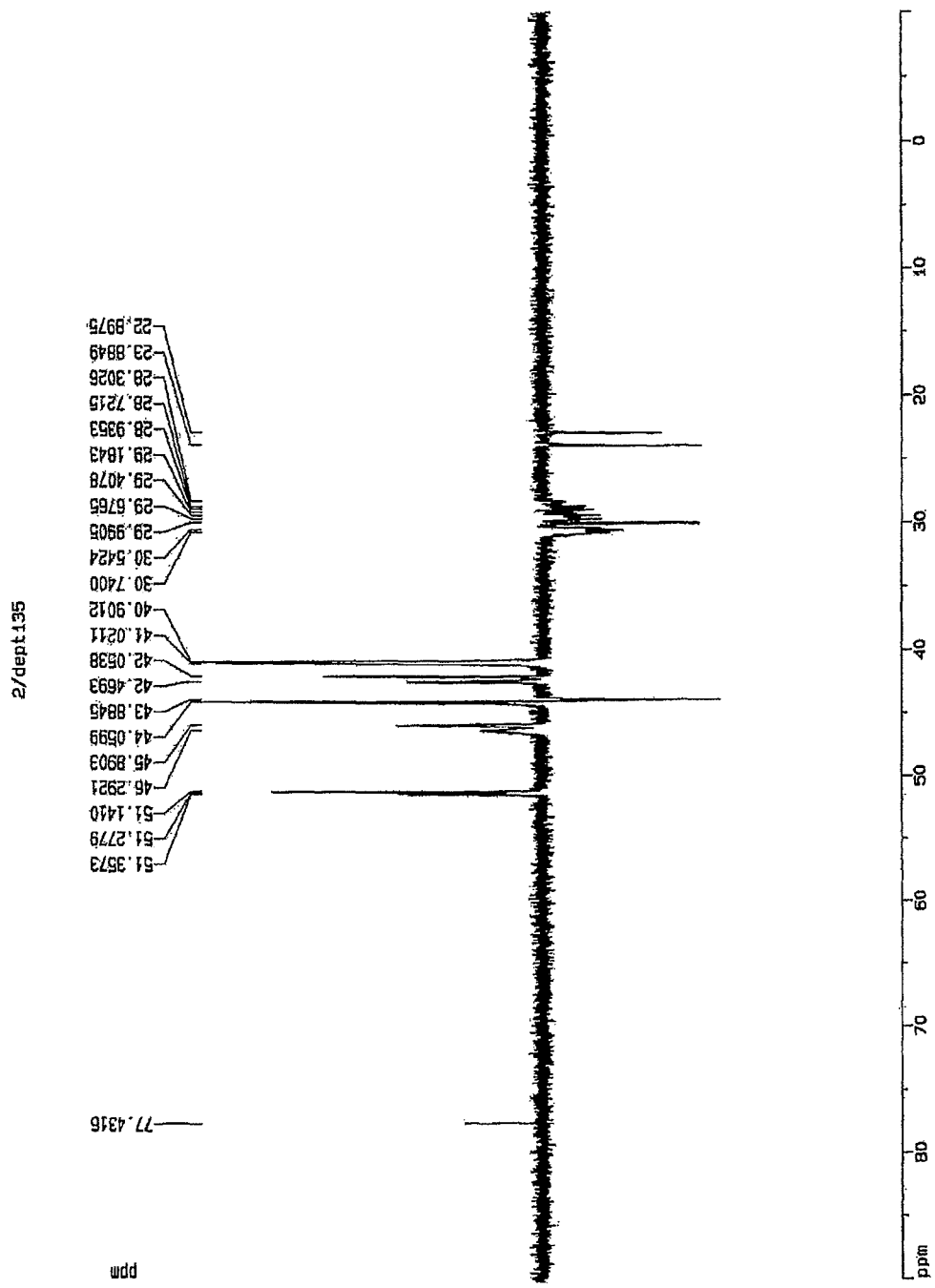
FIG. 2 shows a $^{13}$C NMR (DEPT) spectrum of a 5,6-dihydrodicyclopentadiene/ethylene copolymer (which is obtained at an ethylene pressure of 20 psig)
Figure 3:
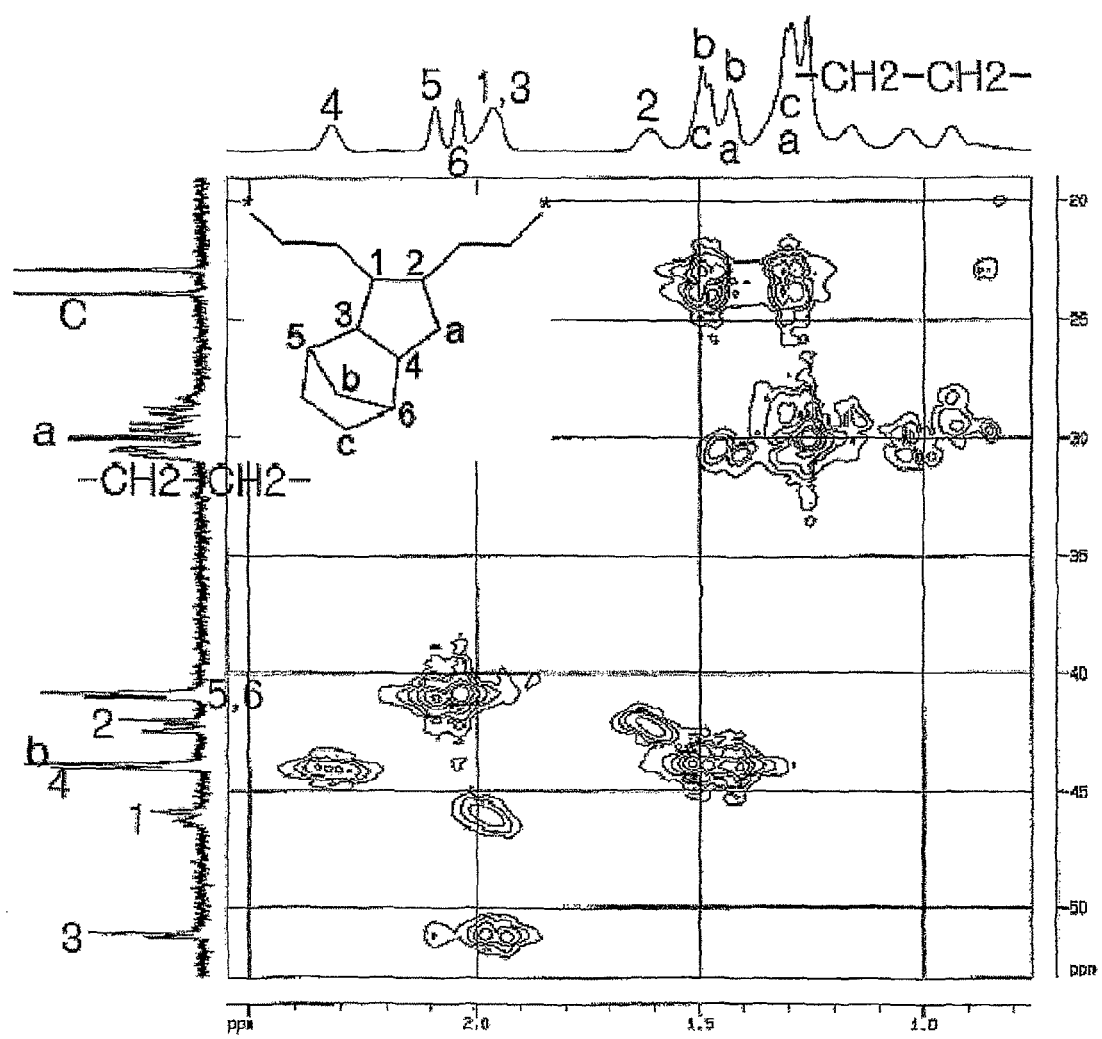
FIG. 3 shows an HMQC NMR spectrum of a 5,6-dihydrodicyclopentadiene/ethylene copolymer (which is obtained at an ethylene pressure of 20 psig) and a structure thereof.
Figure 4:
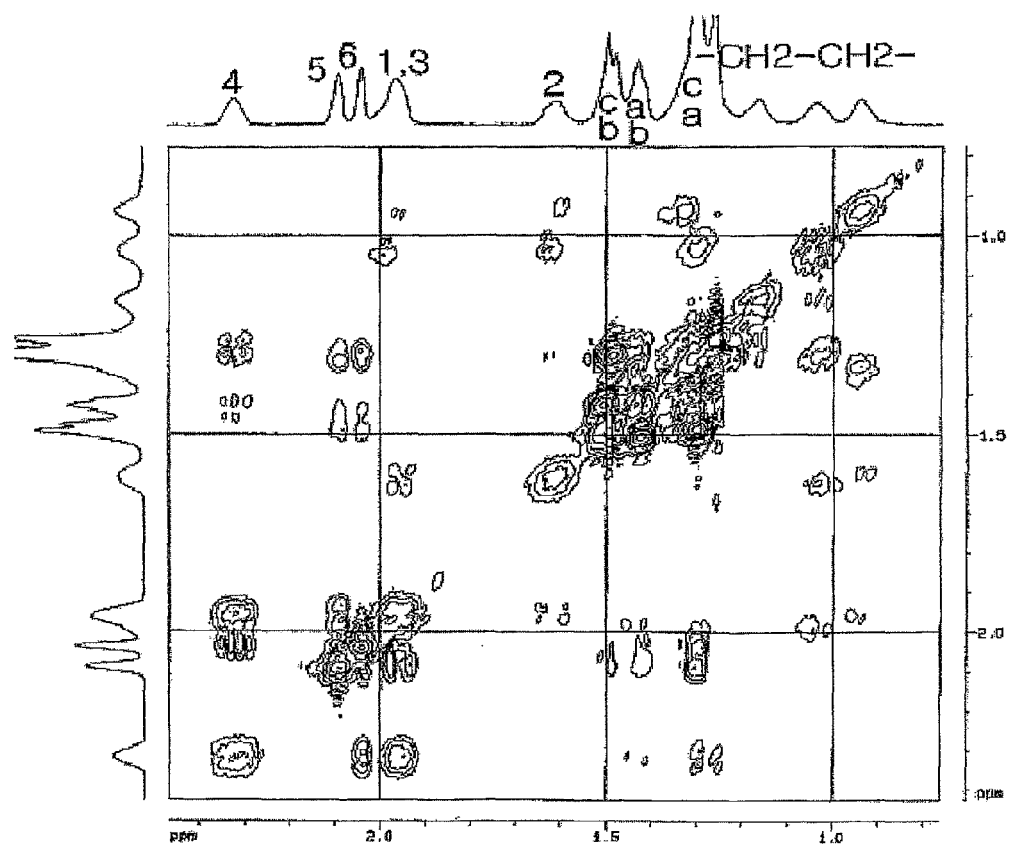
FIG. 4 shows a COSY NMR spectrum of a 5,6-dihydrodicyclopentadiene/ethylene copolymer (which is obtained at an ethylene pressure of 20 psig) and a structure thereof.

Hereinafter, a detailed description will be given of the present invention.

A cycloolefin-based polymer compound according to a first embodiment of the present invention is a cycloolefin-based polymer compound comprising a repeating unit represented by Formula 2 below.

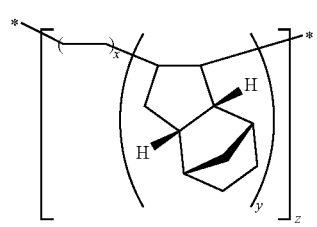

Formula 2 wherein the molar ratio of x:y ranges from 99:1 to 1:99, and z has an average value of 10~20,000.

The cycloolefin-based polymer compound comprising the repeating unit represented by Formula 2 is obtained by vinyl polymerizing 5,6-dihydrodicyclopentadiene represented by Formula 3 below and a vinyl group-containing monomer, in which 5,6-dihydrodicyclopentadiene may be easily prepared via hydrogenation of dicyclopentadiene (Scheme 6; Francisco Alonso, Iosaki Osante and Miguel Yus, Tetrahedron, 2006, 63, 93-102; U.S. Pat. Appl. Publ., 2005038303, 17 Feb. 2005).

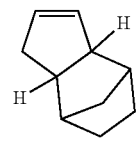

Formula 3

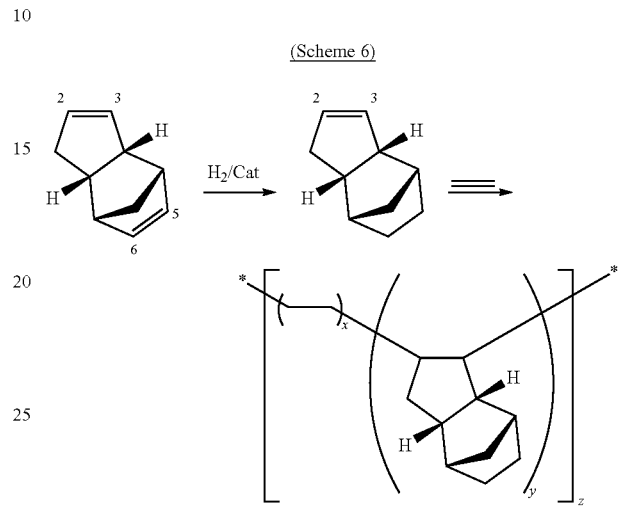

(Scheme 6)

Because the olefin group at the 5-6 positions of dicyclopentadiene is more reactive than the olefin group at the 2-3 positions thereof, when a catalyst and 1 equivalent of hydrogen are added, the olefin group at the 2-3 positions may remain and only the olefin group at the 5-6 positions may be hydrogenated, thus preparing a 5,6-dihydrodicyclopentadiene monomer. The hydrogenation of a small molecule such as dicyclopentadiene is easier in terms of process than the hydrogenation of a polymer material obtained via ROMP.

In particular, this compound may be obtained by selectively hydrogenating the olefin group using an N-heterocyclic-carbene-coordinated palladium compound catalyst, which will be described later.

In the present invention, the 5,6-dihydrodicyclopentadiene that may be obtained via such a simple process is copolymerized with ethylene, whereby the cycloolefin-based copolymer may be prepared. As such, because 5,6-dihydrodicyclopentadiene is a bulky monomer, it is possible to attain the properties of conventional cycloolefin-based polymer compounds prepared using DMON which results from reacting norbornene with cyclopentadiene.

Furthermore, the molecular structure of the polymer obtained using 5,6-dihydrodicyclopentadiene is similar to the molecular structure (the polymeric structure at the bottom of Scheme 4) of a polymer obtained by subjecting DMON to ROMP and then hydrogenation, and thus similar properties may be expected.

Above all, the preparation of the 5,6-dihydrodicyclopentadiene monomer is advantageously much easier compared to the preparation of a DMON monomer.

Because of the low reactivity of the olefin group at the 2-3 positions of 5,6-dihydrodicyclopentadiene as mentioned above, cycloolefin copolymers using 5,6-dihydrodicyclopentadiene as a monomer have not yet been reported.

According to the paper reported by Naga, 2005, when 5,6-dihydrodicyclopentadiene is tested to be copolymerized with ethylene using CGC (Constrained Geometry Catalyst) known to be very active in the polymerization of a bulky monomer, 5,6-dihydrodicyclopentadiene does not at all participate in the polymerization and only pure polyethylene is obtained (*J. Polym. Sci., Part A: Polym. Chem.* 2005, 43. 1285-1291).

On the other hand, Wagerner reported in 1996 that the disappearance of the double bond upon addition of a $WCl_3$-$Et_2AlCl$ combination known as a metathesis catalyst to 5,6-dihydrodicyclopentadiene is confirmed using NMR spectrometry and this catalyst induces the olefin polymerization of 5,6-dihydrodicyclopentadiene (T. A. Davidson, K. B. Wagerner, D. B. Priddy, *Macromolecules* 1996, 29, 786-788). However, the compound thus obtained is in the form of an oligomer the molecular weight of which is not so large, and is irrelevant to copolymers using 5,6-dihydrodicyclopentadiene according to the present invention.

The compound represented by Formula 3 may include endo- and exo-isomers. The dicyclopentadiene compound obtained from C5 fractions from naphtha cracking comprises a mixture of endo- and exo-isomers. Typically, the endo-isomer is excessively contained in an amount of 90 mol % or more. As mentioned above, the compound of Formula 3 is obtained via hydrogenation of the dicyclopentadiene compound resulting from the C5 fraction from naphtha cracking. Because the mixing ratio of endo- and exo-isomers is not changed by hydrogenation, the compound of Formula 3 that is typically prepared includes an excess of endo-isomer.

According to the embodiment of the present invention, the cyclooleefin-based polymer compound comprising the repeating unit represented by Formula 2 may be a cycloolefin-based copolymer obtained by vinyl copolymerizing the compound of Formula 3 with ethylene. In Formula 1, the molar ratio of x:y may range from 99:1 to 1:99. In the preparation of a transparent amorphous resin, the molar ratio of x:y preferably ranges from 90:10 to 10:90, and more preferably from 90:10 to 50:50. The molar ratio of x:y in the polymer chain may be controlled by adjusting the molar ratio of two monomers which are added into the reactor. Furthermore, z which shows the degree of polymerization may have an average value of 10~20,000, and preferably 500~3000 in terms of ensuring appropriate mechanical strength.

The cycloolefin-based polymer compound according to the first embodiment of the present invention may be a polymer compound obtained by vinyl copolymerizing, with ethylene, a mixture of the compound of Formula 3 and one cycloolefin selected from among a compound represented by Formula 5 below and cyclopentene.

Formula 5

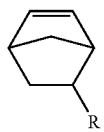

wherein R is a hydrogen atom, a C1~6 alkyl group or a phenyl group. Preferably, a compound in which R is H, namely, norbornene, may be used.

Such a polymer compound may be a polymer compound further comprising a repeating unit of Formula 4 below in addition to the repeating unit represented by Formula 2.

Formula 4

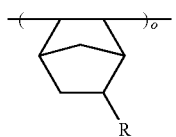

wherein R is a hydrogen atom, a C1~6 alkyl group or a phenyl group.

As such, the molar ratio of x:(y+o) may range from 99:1 to 1:99, and preferably from 90:10 to 10:90 in terms of obtaining a transparent amorphous resin. The molar ratio of y:o is controllable depending on the ratio of two cycloolefins to be added, and y and o may be any variable number, except for 0.

The compound of Formula 3, the olefin group of which has low reactivity as mentioned above, was unable to be copolymerized with ethylene even in the presence of CGC known to be very active in the copolymerization of a bulky monomer.

In the present invention, the olefin polymerization of the compound of Formula 3 and the vinyl monomer is induced using a compound represented by Formula 6 below as a catalyst precursor. Specifically, the catalyst for use in the preparation method according to the present invention is formed by activating the compound of Formula 6 using a co-catalyst comprising one or more selected from among methylaluminoxane, $Al(R^3)_3$, $B(Ar_f)_3$, and $[L]^+[B(Ar_f)_4]^-$. When the compound of Formula 3 is olefin copolymerized with the vinyl monomer in the presence or absence of a solvent using the above catalyst, the cycloolefin-based polymer compound according to the present invention may be obtained.

Formula 6

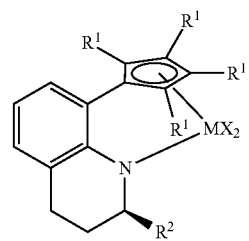

wherein M is Ti, Zr or Hf; X is halogen or a C1~20 alkyl group; $R^1$ which are the same or different are a hydrogen radical, a C1~20 alkyl group, an alkenyl group or an alkynyl group; and $R^2$ which are the same or different are a hydrogen radical, a C1~20 alkyl group, an alkenyl group or an alkynyl group. Preferably M is Ti; X is a methyl group or a chlorine radical; both $R^1$ and $R^2$ are a methyl group.

The compound represented by Formula 6 may be prepared by the present inventors using a known compound via a known process (Wu, C. J.; Lee, S. H.; Yun, H.; Lee, B. Y. *Organometallics* 2007, 26, 6685-6687).

Specifically, methylaluminoxane may be obtained by partially hydrolyzing trimethylaluminum alone or a mixture of trimethylaluminum and triisobutylaluminum, and is commercially available. The structure thereof is predicted to have a liner, circular or network structure of —[Al(Me or iBu)-O]$_a$—.

In $Al(R^3)_3$, $R^3$ which may be the same or different are a halogen radical, or a C1~20 hydrocarbyl radical, and preferably methyl, ethyl or isobutyl.

In $B(Ar_f)_3$, $Ar_f$ is a fluorine atom-substituted aryl group, and preferably a pentafluorophenyl group ($C_6F_5$).

In $[L]^+[B(Ar_f)_4]^-$, $Ar_f$ is defined as above, and $[L]^+$ is a carbocation or tert-ammonium. $Ar_f$ is preferably pentafluorophenyl ($C_6F_5$), and $[L]^+$ is preferably $[Ph_3C]^+$ or $[PhNMe_2H]^+$.

The olefin polymerization using such a catalyst may be carried out in the presence or absence of a solvent. As such, the solvent may include toluene, hexane, cyclohexane, methylene chloride, or chlorobenzene. Particularly useful is toluene.

In addition, according to a second embodiment of the present invention, a cycloolefin-based polymer compound is represented by Formula 7 below.

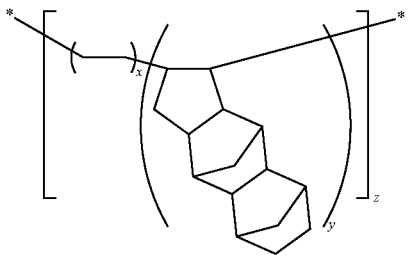

Formula 7 wherein the molar ratio of x:y ranges from 99:1 to 1:99, and z has an average value of 10~20,000.

The cycloolefin-based polymer compound comprising the repeating unit of Formula 7 is obtained by vinyl copolymerizing a dihydrotricyclopentadiene vinyl group-containing monomer represented by Formula 8 below with ethylene. The dihydrotricyclopentadiene may be prepared via hydrogenation of tricyclopentadiene as shown in Scheme 7 below.

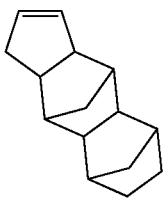

Formula 8

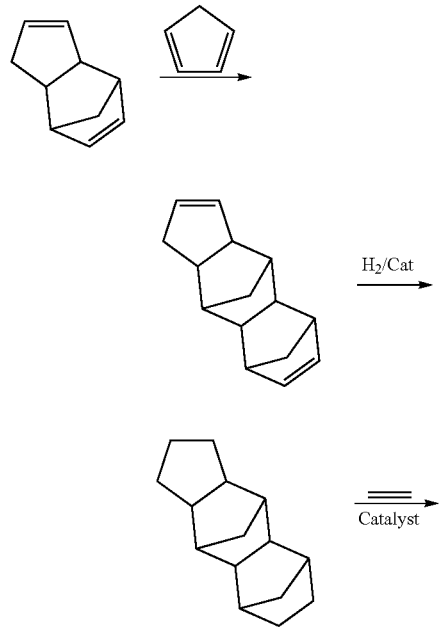

(Scheme 7)

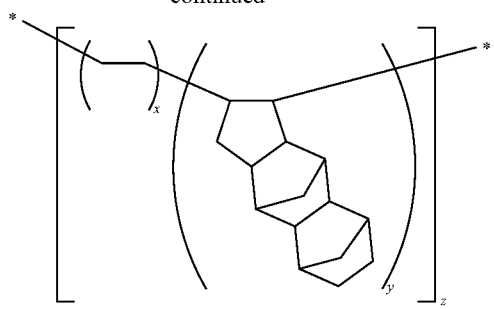

-continued

Tricyclopentadiene may be prepared by subjecting dicyclopentadiene and cyclopentadiene to a Diels-Alder reaction. Research into formation yields of tricyclopentadiene depending on reaction conditions have been reported (Zhongqiang Xiong, Zhentao Mi and Xiangwen Zhang, *React. Kinet. Catal. Lett. Vol.* 85, 89-97 (2005)), but purely separating only main isomers of tricyclopentadiene from by-products was not reported.

In the present invention, in order to purely separate only main isomers of tricyclopentadiene from by-products, a recrystallization method may be introduced, which includes dissolving by-products in ethanol so that desired materials are separated using a difference in solubility depending on temperature.

The selective hydrogenation of only norbornene-type olefin among two olefins of tricyclopentadiene thus obtained may involve various methods.

For example, according to a paper reported by Athelstan L. J. Beckwith and Martin L. Gilpin in J. C. S. Perkin I, 1977, pp 19-27, selective hydrogenation was performed by adding 1 equivalent of hydrogen using a nickel compound catalyst prepared by the reduction of nickel acetate with $NaBH_4$ in ethanol. Also in the case of dicyclopentadiene, because norbornene-type olefins have high reactivity, attempts have been made to perform selective hydrogenation using 1 equivalent of hydrogen in the presence of a catalyst (Brunel, J. M. *Tetrahedron* 2007, 63, 3899.; Alonso, F.; Osante, I.; Yus, M. *Tetrahedron* 2007, 63, 93; Bartlett, P. D.; Banavali, R. *J. Org. Chem.* 1991, 56, 6043). In this case, however, selectivity is obtained using 1 equivalent of hydrogen, and if the amount of hydrogen is not adjusted during the reaction, compounds in which both of the two olefin groups are reduced and compounds in which neither of the two olefin groups are reduced may be by-produced, undesirably causing problems. Also, in order to obtain high selectivity, the state of the catalyst and the reaction conditions should be sensitively controlled.

For these reasons, the use of a catalyst which enables only the norbornene-type olefin group of tricyclopentadiene to be selectively hydrogenated is preferable, and an example thereof includes an N-heterocyclic-carbene-coordinated palladium compound.

In the present invention, dihydrotricyclopentadiene obtained thus may be copolymerized with ethylene, leading to cycloolefin-based copolymers. Hence, dihydrotricyclopentadiene which is bulky is advantageous because the polymer chain may have high Tg and may be imparted with flexibility even when including only the cycloolefin in a small amount.

The compound represented by Formula 8 may include four isomers due to endo and exo geometry. The dicyclopentadiene compound serving as a starting material is typically a mixture comprising an endo-isomer and an exo-isomer at 9:1 or more. Furthermore, when the norbornene-type olefin group and cyclopentadiene are subjected to a Diels-Alder reaction, endo- and exo-compounds may also be formed. Among these compounds, only two compounds were reported to be formed at a ratio of about 5:1, according to a paper reported by Zhongqiang Xiong, Zhentao Mi, Xiangwen Zhang in *React. Kinet. Catal. Lett.* Vol. 85, 89-97 (2005). The monomer used in the present invention is a pure dihydrotricyclopentadiene compound prepared by removing a small proportion of a compound of the mixture using recrystallization thus obtaining a pure single isomer which is then hydrogenated. This compound is used to precisely analyze the newly prepared polymer compound, or alternatively the isomers may be used as a mixture without being separated and thus polymers may be prepared.

According to the second embodiment of the present invention, the cycloolefin-based polymer compound comprising the repeating unit represented by Formula 7 may be a cycloolefin-based copolymer resulting from vinyl copolymerizing the compound of Formula 8 with ethylene, in which in Formula 7 the molar ratio of x:y may range from 99:1 to 1:99. In order to prepare a transparent amorphous resin, the molar ratio of x:y preferably ranges from 90:10 to 10:90, and more preferably from 90:10 to 50:50. The molar ratio of x:y in the polymer chain may be controlled by adjusting the molar ratio of two monomers which are added into the reactor. Also, z showing the degree of polymerization may have an average value of 10~20,000, and preferably 500~3000 in terms of attaining suitable mechanical strength.

The catalyst system and the solvent used in the polymerization are as described in the first embodiment.

In the case of the cycloolefin-based copolymer represented by Formula 7 according to the second embodiment of the present invention, it has a much higher Tg than that of the copolymer of 5,6-dihydrodicyclopentadiene and ethylene as represented by Formula 2 according to the first embodiment, and also, makes it possible to prepare a copolymer including 5,6-dihydrotricyclopentadiene in a large amount (max. 45%). Hence, cycloolefin-based copolymers which are more widely usable may be provided.

In the preparation of the cycloolefin-based copolymers according to the first and second embodiments of the present invention, an example of the cyclic monomer may include a compound represented by Formula 12 below, which may be obtained using selective hydrogenation of only one olefin group of a compound having two olefin groups having different reactivities as represented by Formula 11 below.

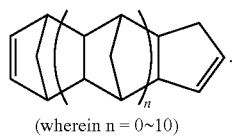

Formula 11

(wherein n = 0~10)

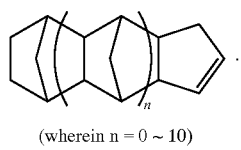

Formula 12

(wherein n = 0 ~ 10)

In the compound represented by Formula 11, a dicyclopentadiene compound in which n is 0 is obtained from a C5 fraction from naphtha cracking and may include a mixture of endo- and exo-isomers. As such, the endo-isomer is typically excessively contained in an amount of 90 mol % or more. According to the present invention, this compound may be used with endo- and exo-isomers being mixed together or purely separated.

In the compound represented by Formula 11, tricyclopentadiene in which n is 1 may be prepared by subjecting dicyclopentadiene and cyclopentadiene to a Diels-Alder reaction (Zhongqiang Xiong, Zhentao Mi and Xiangwen Zhang, *React. Kinet. Catal. Lett.* Vol. 85, 89-97 (2005); Athelstan L. J. Beckwith and Martin L. Gilpin, J. C. S. Perkin I, 1977, pp 19-27). Furthermore, tricyclopentadiene may include four isomers due to endo and exo geometry, among which only two compounds are formed at a ratio of about 5:1 according to the paper reported by Zhongqing Xiong, Zhentao Mi, Xiangwen Zhang in *React. Kinet. Catal. Lett.* Vol. 85, 89-(2005). In the present invention, this compound may be used with endo- and exo-isomers being mixed together or purely separated.

Moreover, in the compound represented by Formula 11, any compound in which n is 2 or more has not yet been reported to be used with isomers being separated. However, when this compound is subjected to thermalization with dicyclopentadiene, it is reported to be obtained as a mixture along with the compound in which n is 1 (Chemical Engineering Science 56 (2001) 927-935). The mixture thus obtained may be hydrogenated using the above catalyst, whereby the mixture of Formula 2 may be prepared.

The N-heterocyclic-carbene-coordinated palladium compound is recently summarized in *Acc. Chem. Res.,* 2008, 41, 1523-1533 by Sebastian W and Frank Glorius. As such, the oxidation state of palladium may be zerovalent and divalent.

According to an embodiment of the present invention, the N-heterocyclic-carbene-coordinated palladium compound is used as a hydrogenation catalyst, and is particularly used in the selective hydrogenation of the olefin group of dicyclopentadiene, tricyclopentadiene and similar cyclopentadiene Diels-Alder reaction products.

A specific example of the N-heterocyclic-carbene-coordinated palladium compound may comprise a compound of Formula 10 below.

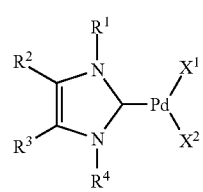

Formula 10 wherein $R^1$ and $R^4$ are independently selected from among C1~20 alkyl and C6~30 aryl groups substituted or unsubstituted with a hetero atom such as N, O or S; $R^2$ and $R^3$ are independently selected from among a hydrogen atom, and C1~20 alkyl and C6~30 aryl groups substituted or unsubstituted with a hetero atom such as N, O or S; $X^1$ and $X^2$ are independently selected from among a halogen ligand, a substituted or unsubstituted allyl ligand, and a carboxylate ligand, or selected from among an olefin ligand and a solvent ligand; and two compounds may be present in dimeric form.

More specifically, the compound represented by Formula 10 may include a compound in which both $R^1$ and $R^4$ are 2,6-diisopropylphenyl (2,6-iPr$_2$C$_6$H$_3$—); both $R^2$ and $R^3$ are a hydrogen atom; and both $X^1$ and $X^2$ are chlorine or acetate, in which case two compounds are able to be present in dimeric form, or one of $X^1$ and $X^2$ is chlorine and the other is allyl, and such compounds are commercially available (from e.g. Strem Co. Ltd.).

When the selective hydrogenation of the compound represented by Formula 11 is carried out in the presence of the above catalyst, the amount of catalyst is not particularly limited. However, in light of the economic efficiency of hydrogenation, the weight ratio of [olefin]/[Pd] may range from 1000 to 100000.

Also, the hydrogenation may be carried out in the presence or absence of a solvent. Examples of the solvent include toluene, hexane, cyclohexane, methylene chloride, tetrahydrofuran (THF), methanol, ethanol, isopropanol, acetonitrile, ethyl acetate, diethyl ether, and so on.

In the hydrogenation, a hydrogen source may include hydrogen gas ($H_2$), or formic acid as reported in *Angew. Chem. Int. Ed.* 2008, 47, 3223. The use of hydrogen gas is more preferable in terms of economic efficiency. As such, the hydrogen pressure may range from atmospheric pressure to about 100 bar, and preferably falls in the range of 5~30 bar in consideration of the stability of a reactor and the reaction rate.

The reaction temperature may range from room temperature to 200° C., and is preferably set to room temperature so as to allow for the economic efficiency of reaction.

After hydrogenation, the hydrogenated product-containing solution is passed through short silica gel pads thus removing the catalyst, resulting in a pure compound. The palladium compound or palladium metal may be recovered from the filtered catalyst, and thus re-used.

According to the above method, the compound of Formula 12 in which only the norbornene-type olefin group is selectively hydrogenated may be obtained. In particular, a compound of Formula 12 in which n=0, namely, the compound of Formula 3, or a compound of Formula 12 in which n=1, namely, the compound of Formula 8 may be obtained. When the N-heterocyclic-carbene-coordinated palladium compound according to the embodiment of the present invention is used as a catalyst, the hydrogenation selectivity may be at least 90%, and actually 100%.

Also, when the N-heterocyclic-carbene-coordinated palladium compound according to the embodiment of the present invention is used as a catalyst, the catalytic activity (which is evaluated to be a turnover number (TON)) is 1000 or more, and thus hydrogenation may be achieved at high yield even when a small amount of catalyst is used.

The product, which is obtained by selectively hydrogenating only one olefin group of the compound having two olefin groups having different reactivities, such as dicyclopentadiene, tricyclopentadiene and similar cycloolefin Diels-Alder reaction products, may be usefully utilized in copolymerization with another olefin compound as illustrated in the first and second embodiments.

For example, vinyl polymerization and ring opening polymerization (ROMP) which selectively use a norbornene-type olefin group having higher reactivity from among the two olefin groups of dicyclopentadiene have been mainly developed and reported (Journal of Organometallic Chemistry 691 (2006) 31143121; Xiaofang Li and Zhaomin Hou, *Macromolecules* 2005, 38, 6767-6769; Xiaofang Li, Masayoshi Nishiura, Kyouichi Mori, Tomohiro Mashiko and Zahomin Hou, *Chem. Commun.*, 2007, 41374139; Masahiro Yamazaki, *Journal of Molecular Catalysis A: Chemical* 213 (2004) 8187). In this case, because the produced polymer includes the olefin group, it is problematic in terms of direct commercial use. The olefin group having high reactivity may cause the deformation of resins upon melting and may deteriorate durability. For these reasons, the use of resins the polymer chain of which includes the olefin group is not common in the industrial world. As such, the complete removal of double bond of the polymer chain using hydrogenation is essentially required. However, it is not easy to convert all of double bonds into single bonds by hydrogenating the polymer compound including the olefin group.

Hence, among the two olefin groups of dicyclopentadiene, only the norbornene-based olefin group is selectively hydrogenated thus obtaining 5,6-dihydrodicyclopentadiene which is then used as a monomer so as to be copolymerized with ethylene. In this regard, copolymerization methods according to the embodiments of the present invention as shown in Schemes 5 and 6 are illustrated.

The catalyst according to the present invention enables the selective preparation of the cycloolefin monomer significantly usable upon preparation of the copolymer using such a method, and thereby the commercial preparation of copolymers according to the method according to the first and second embodiments of the present invention is expected to be more efficient.

A better understanding of the present invention may be obtained thanks to the following examples which are set forth to illustrate, but are not to be construed to limit the present invention.

Examples 1 to 4

5,6-Dihydrodicyclopentadiene-Ethylene Copolymerization 5,6-dihydrodicyclopentadiene (5.37 g, 40 mmol) and magnetic bars were added into a polymerization reactor in a nitrogen atmosphere, after which toluene was added thereto so as to obtain a total amount of 28 ml. This polymerization reactor was heated to 70° C. with stirring. A compound (0.7 mg, 2 µmol) represented by Formula 6, $[Ph_3C]^+[B(C_6F_5)_4]^-$ (7.4 mg, 8.0 µmol), and triisobutylaluminum (160 mg, 800 µmol) were mixed with 2.0 ml of toluene in a dry box, after which the resulting mixture was added into the reactor using a syringe while being stirred at 70° C., and also ethylene gas was fed therein at a pressure of 60 psig. After 3 min, the ethylene pressure was released, and the reactor was opened and thus the reaction solution was introduced into a vessel containing 30 ml of methanol and thus the reaction product precipitated. Filtration was performed, thus obtaining a precipitate. The precipitate was decompressed to a vacuum at 100° C., so that the remaining solvent was removed therefrom, thereby obtaining 1.8 g of a polymer material.

On the other hand, while the ethylene pressure was decreased to 40 psig, 20 psig, and 10 psig, the polymerization time was adjusted to 7.0 min, 8.0 min, and 6.0 min, thus obtaining viscous solutions, from which 1.8 g, 1.9 g and 0.4 g of polymer materials were respectively obtained. The structures of polymer materials thus obtained were accurately analyzed using NMR (FIGS. 1 to 4). The copolymers obtained at an ethylene pressure of 20 psig were identified as shown in FIGS. 1 to 4, and the copolymers obtained at the other ethylene pressures could also be identified to be a 5,6-dihydrodicyclopentadiene-ethylene copolymer.

The amount of 5,6-dihydrodicyclopentadiene (HDCPD) that participated in the reaction was determined by the following relation using the integrated value of an $^1H$ NMR spectrum based on the NMR structural analysis of FIG. 1.

$A$=integrated value of 2.5~1.8 ppm $B$=integrated value of 1.8~0.8 ppm

Amount of HDCPD=$(A/5)/[(A/5)+(B-9)/4]$

Tg was measured using DSC, and the molecular weight and the molecular weight distribution were measured using polystyrene as a standard using GPC. The results are shown in Table 1 below.

TABLE 1

| Ex. | Ethylene Pressure (psig) | HDCPD Amount (mol %) | TON (kg/Ti-molh) | Tg (° C.) | Weight Average Molecular Weight (Mw) (g/mol) | Molecular Weight Distribution Mw/Mn |
|---|---|---|---|---|---|---|
| 1 | 60 | 24 | $1.8 \cdot 10^4$ | −2.8 | 54000 | 1.7 |
| 2 | 40 | 30 | $7.3 \cdot 10^3$ | 17.4 | 47000 | 1.6 |
| 3 | 20 | 33 | $7.3 \cdot 10^3$ | 62.4 | 44000 | 1.5 |
| 4 | 10 | 50 | $2.0 \cdot 10^3$ | 100.8 | 33000 | 1.5 |

Example 5

5,6-Dihydrodicyclopentadiene-Norbornene-Ethylene Terpolymerization 5,6-dihydrodicyclopentadiene (2.7 g, 20 mmol), norbornene (1.9 g, 20 mmol) and magnetic bars were added into a polymerization reactor in a nitrogen atmosphere, after which toluene was added thereto so as to obtain a total amount of 28 ml. This polymerization reactor was heated to 70° C. with stirring. A catalyst (0.7 mg, 2 μmol) represented by Formula 6, $[Ph_3C]^+[B(C_6F_5)_4]^-$ (7.4 mg, 8 μmol), and triisobutylaluminum (160 mg, 800 μmol) were mixed with 2.0 in of toluene in a dry box, after which the resulting mixture was added into the reactor using a syringe while being stirred at 70° C., and also ethylene gas was fed thereto at a pressure of 40 psig. After 7 min, the ethylene pressure was released, and the reactor was opened, and 30 ml of methanol was added and thus the reaction product precipitated. Filtration was performed, thus obtaining a powder. The powder was decompressed to a vacuum at 100° C., so that the remaining solvent was removed from the precipitate, thereby obtaining 1.8 g of a polymer material.

The polymer material thus obtained had a Tg of 100.4° C., a weight average molecular weight (Mw) of 96000 and a molecular weight distribution (Mw/Mn) of 1.47.

Figure 5:
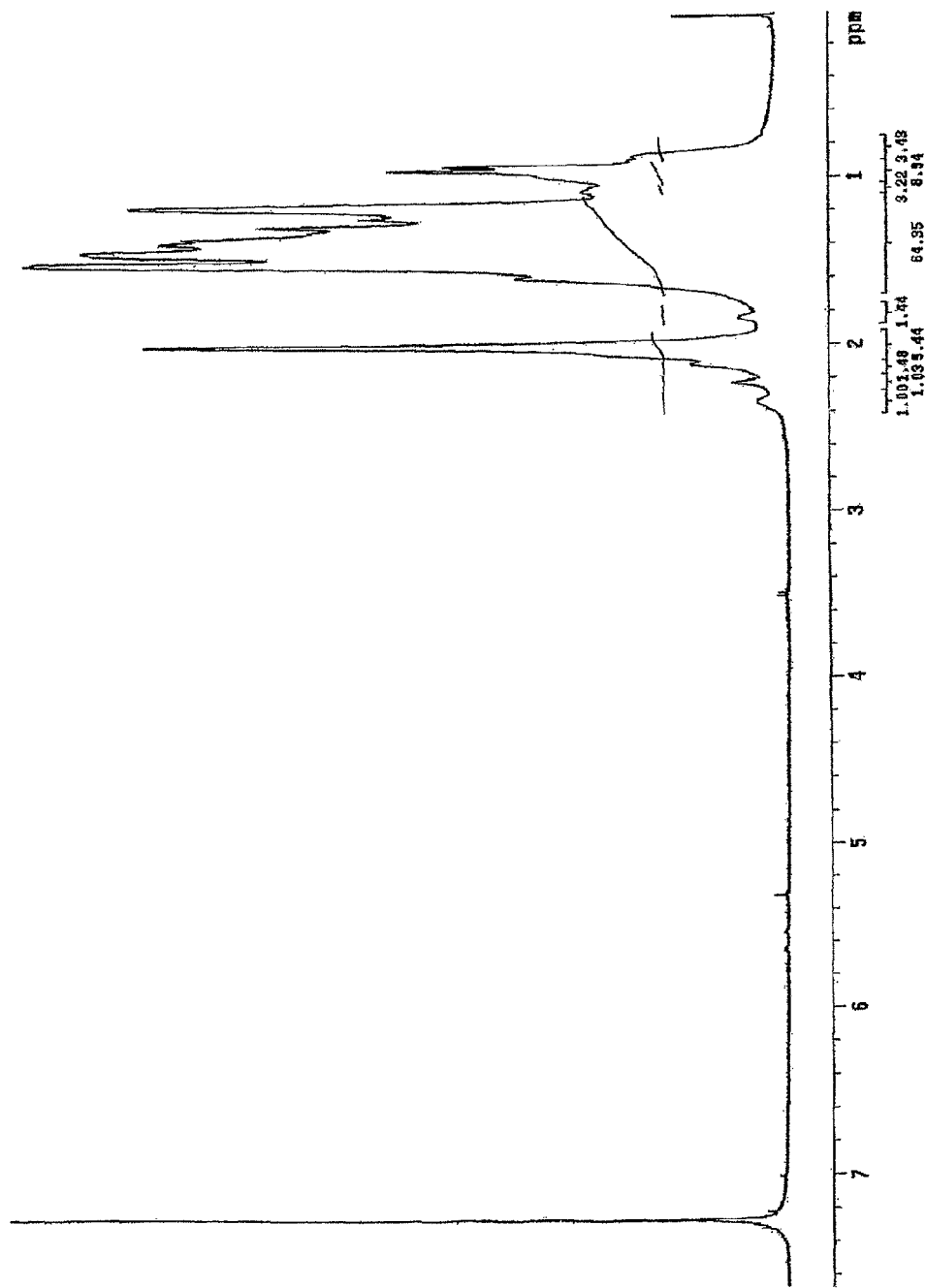
FIG. 5 shows $^1$H NMR data of a 5,6-dihydrodicyclopentadiene-norbornene-ethylene terpolymer.

FIG. 5 shows a $^1$H NMR spectrum thereof. The integrated value of the spectrum was analyzed, thus determining amounts of three monomers. Accordingly, the ratio of ethylene:norbornene:5,6-dihydrodicyclopentadiene was determined to be 10:4.0:1.0 according to the following analysis.

Leftmost, 2.3~2.4 ppm signal: HDCPD→integrated value 1.0

1.9~2.3 ppm signal: four hydrogen signals of HDCPD+ two hydrogen signals of norbornene 0.8~1.9 signal: nine hydrogen signals of HDCPD+eight hydrogen signals of norbornene+four hydrogen signals of ethylene Example 6

5,6-Dihydrodicyclopentadiene-Cyclopentene-Ethylene Terpolymerization 5,6-dihydrodicyclopentadiene (2.7 g, 20 mmol), cyclopentene (1.4 g, 20 mmol) and magnetic bars were placed in a polymerization reactor in a nitrogen atmosphere, after which toluene was added thereto so as to obtain a total amount of 28 ml. This polymerization reactor was heated to 70° C. with stirring. A catalyst (0.69 mg, 2 μmol) represented by Formula 6, $[Ph_3C]^+[B(C_6F_5)_4]^-$ (7.4 mg, 8 μmol) and triisobutylaluminum (160 mg, 800 μmol) were mixed with 2.0 ml of toluene in a dry box, after which the resulting mixture was added into the reactor using a syringe while being stirred at 70° C., and also ethylene gas was fed thereto at a pressure of 20 psig. After 6 min 30 sec, the ethylene gas was removed, and the reactor was opened, and thus the reaction was terminated. 30 ml of methanol was added and the reaction solution precipitated. Filtration was performed, thus obtaining powder. The powder was then decompressed to a vacuum at 100° C., so that the remaining solvent was removed from the precipitate, thereby obtaining 0.73 g of a polymer material. The polymer material thus obtained had a Tg of 18.4° C., a Mw of 76000 and a Mw/Mn of 1.6.

Figure 6:
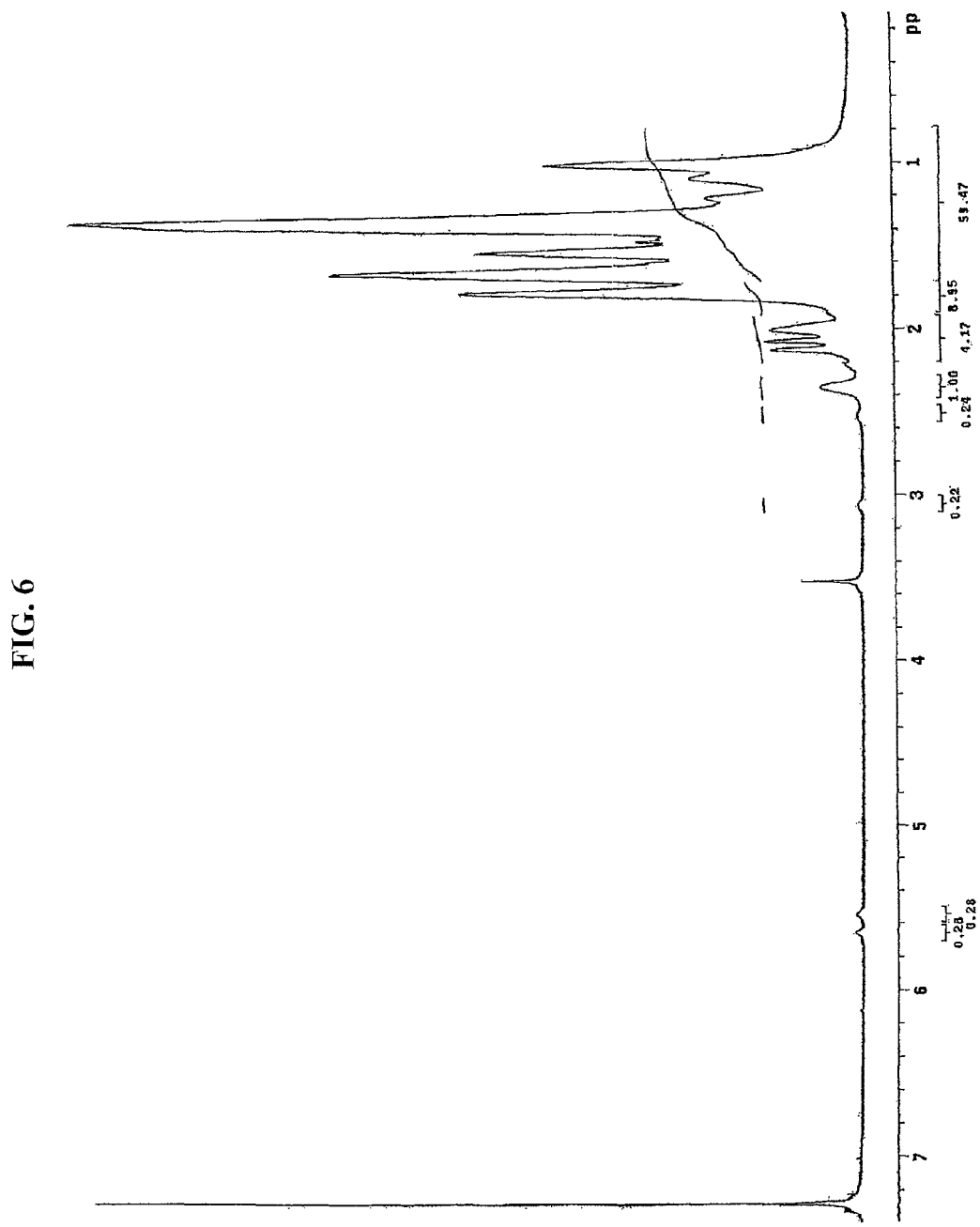
FIG. 6 shows $^1$H NMR data of a 5,6-dihydrodicyclopentadiene-cyclopentene-ethylene terpolymer.

FIG. 6 shows a $^1$H NMR spectrum of the obtained polymer compound. The integrated value of the spectrum was analyzed, thus determining amounts of three monomers. Accordingly, the ratio of ethylene:cyclopentene:5,6-dihydrodicyclopentadiene was determined to be 5.5:4.5:1.0 according to the following analysis.

Leftmost, 2.3~2.4 ppm signal: HDCPD→integrated value 1.0

1.7~1.9 ppm signal: two hydrogen signals of cyclopentene 0.8~1.7 signal: nine hydrogen signals of HDCPD+six hydrogen signals of cyclopentene+four hydrogen signals of ethylene Synthesis Example Synthesis and Purification of Dihydrotricyclopentadiene Compound As dicyclopentadiene was heated to 170° C. and distilled, cyclopentadiene was obtained. 160 g of cyclopentadiene thus obtained and 320 g of dicyclopentadiene were added into an autoclave and then stirred at 300 rpm for 12 hours with a nitrogen pressure of 20 bar being applied at 150° C. After reaction, the unreacted cyclopentadiene and dicyclopentadiene were first removed (380 g) by vacuum distillation at 70° C. Then, the reaction mixture was added with 900 ml of ethanol, and heated to reflux at 80° C. so that the remaining solid material was dissolved, after which the solution was stored in a refrigerator and thus recrystallized, and then filtered, thus obtaining 67 g of pure tricyclopentadiene.

The tricyclopentadiene thus obtained (63 g, 0.318 mol), a compound (18 mg, 0.0318 mmol) of Formula 10 in which $R^1$, $R^4$=2,6-diisopropylphenyl; $R^2$, $R^3$=H; $X^1$=allyl; $X^2$=Cl, and methylene chloride (204 ml) were added into an autoclave and then stirred at 300 rpm for 12 hours under a hydrogen pressure of 20 bar at 25° C. The reaction solution was passed through silica gel so that the catalyst was removed, after which the solvent was removed using vacuum decompression, giving 63 g of a pure compound (yield 99%).

Examples 7 to 15

Dihydrotricyclopentadiene-Ethylene Copolymerization

The dihydrotricyclopentadiene (8.01 g, 40 mmol) obtained in the above synthesis example was added into a polymerization reactor in a nitrogen atmosphere, after which toluene was added thereto so as to obtain a total amount of 28 ml. This polymerization reactor was immersed in a thermostat at 70° C. so as to reach thermal equilibrium. Thereafter, a compound (1.4 mg, 4 μmol) represented by Formula 6, [Ph$_3$C]$^+$[B(C$_6$F$_5$)$_4$]$^-$ (14.7 mg, 16.0 μmol), and triisobutylaluminum (160 mg, 800 μmol) were dissolved in 2.0 in of toluene and the activated catalyst thus obtained was introduced into the reactor using a syringe. Then, ethylene gas was fed thereto at a pressure of 60 prig, and stirring was performed for 8 min. Thereafter, the ethylene pressure was released, and the reactor was opened and thus the reaction solution was introduced into a vessel containing 30 ml of methanol, so that the produced polymer precipitated. Filtration was performed, thus obtaining a precipitate. The precipitate was decompressed to a vacuum at 100° C., so that the remaining solvent was removed from the precipitate, thereby obtaining 2.2 g of a polymer material.

As shown in Table 2 below, in the above method, while the amount of dihydrotricyclopentadiene was fixed to 8.01 g (concentration 1.4 mmol/ml) and the ethylene pressure was changed to 60 psig, 40 psig, 30 psig, 20 psig, and 10 psig, polymerization was performed up to the point of time (8.0 min, 5.0 min, 6.0 min, 6.0 min, 9.0 min, respectively) of obtaining a viscous solution, yielding 2.2 g, 1.8 g, 1.2 g, 1.6 g and 0.6 g of respective polymer materials.

In addition, while the ethylene pressure was fixed to 20 psig and the concentration of the dihydrotricyclopentadiene monomer was changed to 1.4, 1.8, 2.1, 2.8 and 3.2 mmol/ml, polymerization was performed up to the point of time (6.0 min, 8.0 min, 6.0 min, 7.0 min, 7.0 min, respectively) of obtaining a viscous solution using the same method, yielding 1.6 g, 2.3 g, 1.3 g, 1.4 g and 2.2 g of respective polymer materials.

The polymer materials thus obtained were structurally analyzed using the $^1$H NMR spectrum, thus determining the amount of dihydrotricyclopentadiene in the polymer.

Figure 7:
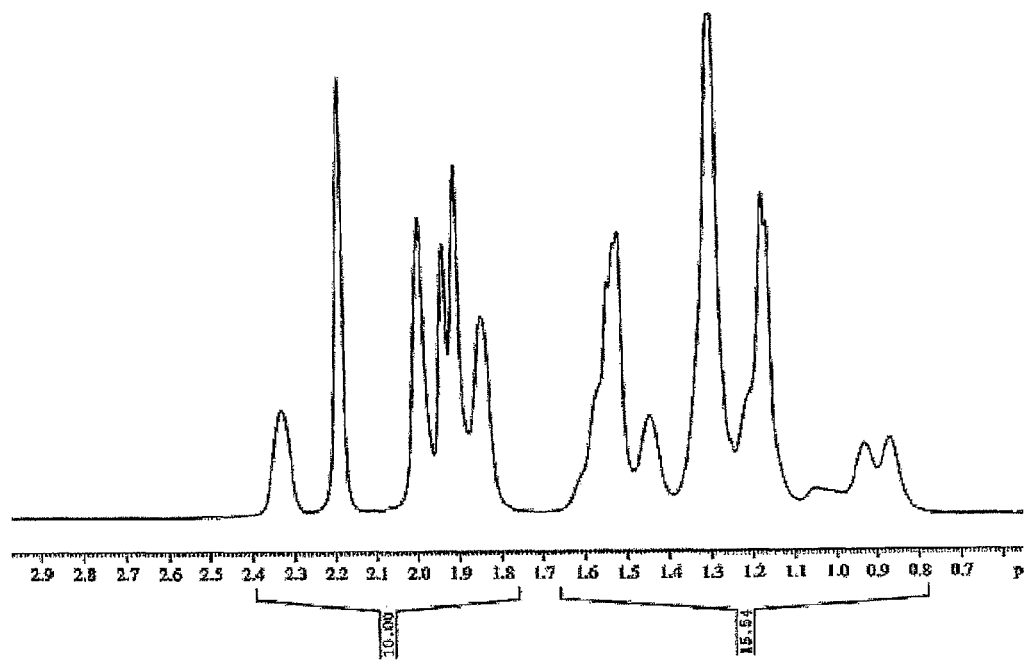
FIG. 7 shows a $^1$H NMR spectrum of a dihydrotricyclopentadiene/ethylene copolymer of Example 15.

For example, FIG. 7 shows $^1$H NMR spectrum of the dihydrotricyclopentadiene/ethylene copolymer (Example 15) obtained using 3.2 mmol/ml dihydrotricyclopentadiene at an ethylene pressure of 20 psig. The amount of dihydrotricyclopentadiene (HTCPD) was determined by the following relation using the integrated value of the $^1$H NMR spectrum.

$A$=integrated value of 2.45~1.75 ppm $B$=integrated value of 1.65~0.75 ppm

Amount of HTCPD=$(A/10)/[(A/10)+(B-10)/4]$

Tg was measured in two scans while the temperature was being increased at a rate of 15° C./min using DSC of Model-Q10 available from Thermal Analysis, and Mw and Mw/Mn were measured using polystyrene as a standard in a THF solvent at 30° C. using GPC of Model 150-C+ available from Waters.

The polymerization results are given in Table 2 below.

As is apparent from Table 2, the cycloolefin-based copolymer using the dihydrotricyclopentadiene compound can be seen to have high Tg. Thereby, the dihydrotricyclopentadiene compound-ethylene copolymers according to the embodiments of the present invention are expected to be useful in various fields because of superior thermal stability.

Figure 8:
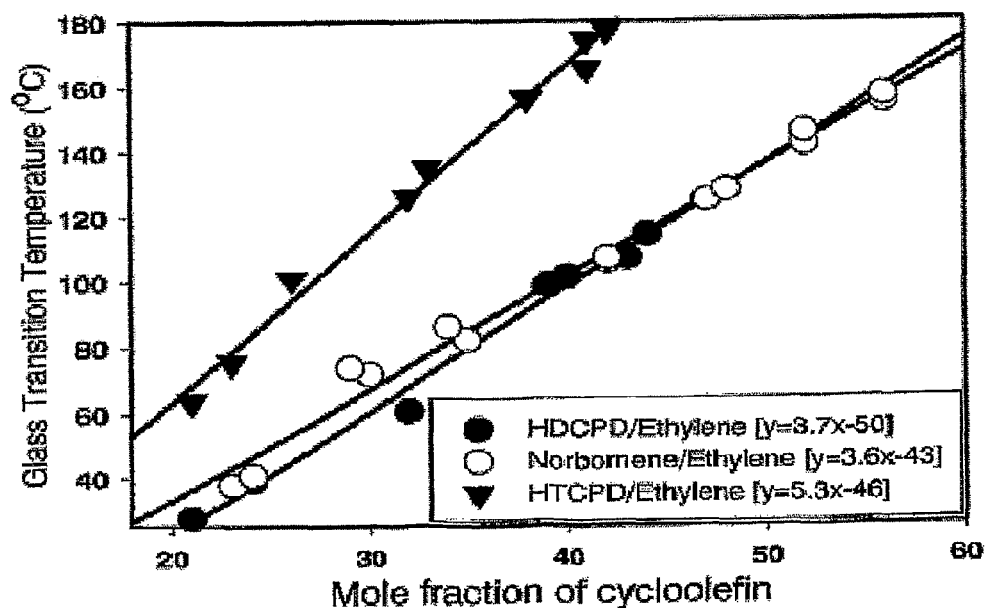
FIG. 8 shows a graph showing changes in Tg of three copolymers depending on the molar ratio of cycloolefin.

In order to more obviously depict the fact that the dihydrotricyclopentadiene (HTCPD)-ethylene copolymer according to the embodiment of the present invention has a Tg higher than that of other cycloolefin copolymers, the Tg thereof is shown in FIG. 8 compared with that of cycloolefin copolymers obtained from other cyclopentadienes (dihydrodicyclopentadiene (HDCPD) and norbornene) for reference.

FIG. 8 illustrates changes in the Tg of three cycloolefin copolymers (HTCPD/ethylene copolymer, norbornene/ethylene copolymer, HDCPD/ethylene copolymer) obtained at different molar ratios of cycloolefins. In particular, the thermal stability of the HTCPD/ethylene copolymer is evaluated to be superior.

Preparation Example 1

Preparation of Compound of Formula 10 ($R^1=R^4=2$, 6-diisopropylphenyl; $R^2=R^3=H$; $X^1$=allyl; $X^2$=Cl)

Scheme 8 below summarizes the preparation of the title compound.

2,6-Diisopropylaniline (15 g, 84.7 mmol) was dissolved in 67 ml of 1-propanol and 15 in of water, after which glyoxal (40% aqueous solution, 5.6 g, 38.5 mmol) was added thereto. The reaction was carried out at 70° C. for 1 hour, the temperature was lowered to room temperature, and then the reaction product was filtered. The remaining solid was dissolved in methylene chloride, added with anhydrous magnesium sulfate and then filtered, after which the filtered solution was decompressed to a vacuum thus removing the solvent. The compound (5.048 g, 12.73 mmol) thus obtained and paraformaldehyde (0.458 g, 15.27 mmol) were dissolved in 83 ml of toluene and stirred at 100° C. for 2 hours. Thereafter, the temperature was lowered to 40° C., and hydrochloric acid (4 N, d=1.05 g/ml dioxane solution, 4.01 g, 15.27 mmol) was added thereto and thus the resulting precipitate was filtered. The solid compound thus obtained was dissolved in methylene chloride and dried over anhydrous magnesium sulfate, and the filtered solution was decompressed to a vacuum, thus removing the solvent. The compound (1.753 g, 4.124 mmol) thus obtained and potassium tert-butoxide (0.508 g, 4.537 mmol) were dissolved in 24 ml of THF and allowed to react with stirring for 4 hours. The solvent was removed using vacuum decompression, after which the product was dissolved in toluene and filtered using celite. The filtered solution was decompressed to a vacuum thus removing the sol-

TABLE 2

| Ex. | Ethylene Pressure (psig) | Ethylene Conc. (M) | HTCPD Conc. (M) | Reaction Time (min) | Yield | TON (kg/Ti-molh) | HTCPD Amount (mol %) | Tg (° C.) | Mw | Mw/Mn |
|---|---|---|---|---|---|---|---|---|---|---|
| 7  | 60 | 1.90 | 1.4 | 8.0 | 2.2 | 4.10$^3$ | 20 | 64  | 11,226 | 1.18 |
| 8  | 40 | 1.30 | 1.4 | 5.0 | 1.8 | 5.3·10$^3$ | 21 | 76  | 13,871 | 1.24 |
| 9  | 30 | 0.95 | 1.4 | 6.0 | 1.2 | 2.8·10$^3$ | 26 | 101 | 12,248 | 1.19 |
| 10 | 20 | 0.63 | 1.4 | 6.0 | 1.6 | 3.9·10$^3$ | 31 | 126 | 10,604 | 1.13 |
| 11 | 10 | 0.32 | 1.4 | 9.0 | 0.6 | 1.8·10$^3$ | 41 | 165 | 9,401  | 1.10 |
| 12 | 20 | 0.63 | 1.8 | 8.0 | 2.3 | 4.3·10$^3$ | 33 | 135 | 11,135 | 1.15 |
| 13 | 20 | 0.63 | 2.1 | 6.0 | 1.3 | 3.3·10$^3$ | 40 | 156 | 9,455  | 1.10 |
| 14 | 20 | 0.63 | 2.8 | 7.0 | 1.4 | 3.0·10$^3$ | 44 | 174 | 9,624  | 1.09 |
| 15 | 20 | 0.63 | 3.2 | 7.0 | 2.2 | 4.7·10$^3$ | 45 | 177 | 10,367 | 1.09 | vent. The compound (1.335 g, 3.435 mmol) thus obtained and palladium allyl chloride (0.629 g, 3.435 mmol) were dissolved in 8 in of THF and stirred for 4 hours. The reaction solution was passed through silica gel and filtered, after which the solution was decompressed to a vacuum thus removing the solvent, giving the title compound of Formula 10 in which $R^1=R^4=$2,6-diisopropylphenyl; $R^2=R^3=$H; $X^1=$allyl; $X^2=$Cl.

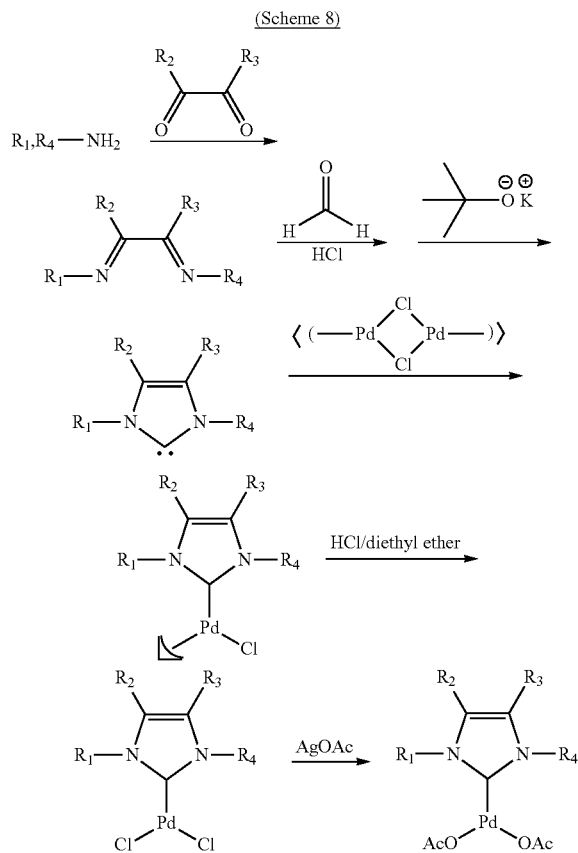

(Scheme 8)

Preparation Example 2

Preparation of Compound of Formula 10 ($R^1=R^4=$2,6-diisopropylphenyl; $R^2=R^3=$H; $X^1=X^2=$Cl)

The compound (0.508 g, 0.889 mmol) of Preparation Example 1 was added with 6.5 ml of hydrochloric acid (1 M ether solution) and then stirred for 3 hours. Filtration was performed thus obtaining a precipitate which was then washed with pentane, thereby obtaining a solid compound. The solid compound was decompressed to a vacuum thus removing the remaining solvent, giving the title compound of Formula 10 in which $R^1=R^4=$2,6-diisopropylphenyl; $R^2=R^3=$H; $X^1=X^2=$Cl.

Preparation Example 3

Preparation of Compound of Formula 10 ($R^1=R^4=$2,6-diisopropylphenyl; $R^2=R^3=$H; $X^1=X^2=$OC(O)CH$_3$)

The compound (0.564 g, 0.498 mmol) of Preparation Example 2 and silver acetate (0.332 g, 1.992 mmol) were stirred for 1 hour in 30 in of THF. The reaction solution was filtered using celite, after which the filtered solution was decompressed to a vacuum thus removing the solvent, giving the title compound of Formula 10 in which $R^1=R^4=$2,6-diisopropylphenyl; $R^2=R^3=$H; $X^1=X^2=$OC(O)CH$_3$.

Example 16

Tricyclopentadiene (77 g, 0.388 mol), the compound (22 mg, 0.0385 mmol) of Preparation Example 1, and methylene chloride (250 ml) were added into an autoclave and decompressed at −78° C., thus removing air therefrom. The temperature was increased to 25° C., after which a hydrogen pressure of 20 bar was applied and stirring was performed at 300 rpm for 12 hours. The reactor was opened, and the reaction solution was passed through silica gel thus removing the catalyst, after which the solvent was removed using vacuum decompression, giving 77 g of a pure compound (yield 100%, selectivity 100%).

Figure 9:
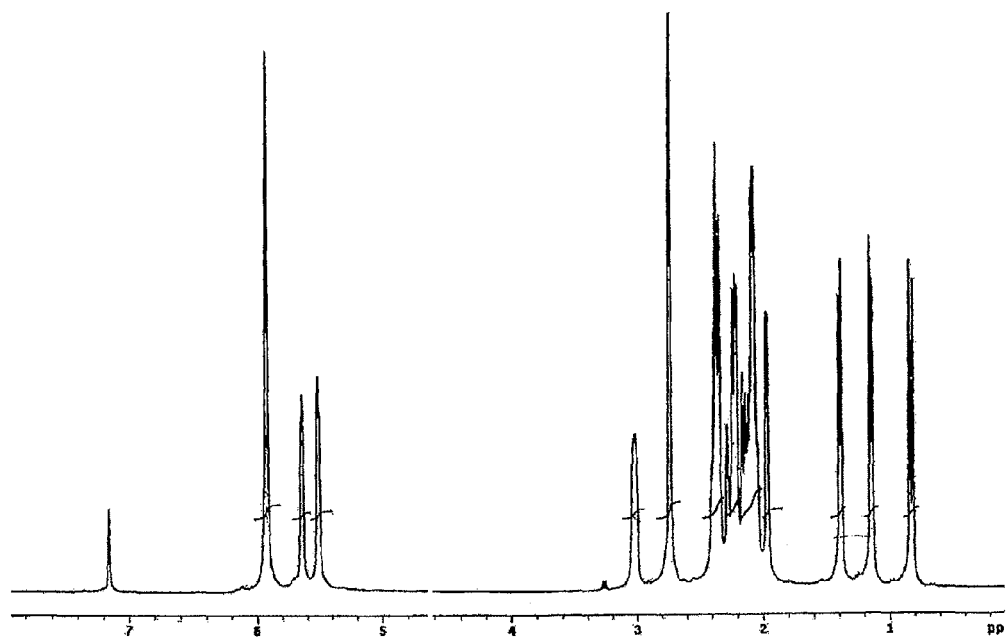
FIG. 9 shows a $^1$H NMR spectrum of tricyclopentadiene before hydrogenation.
Figure 10:
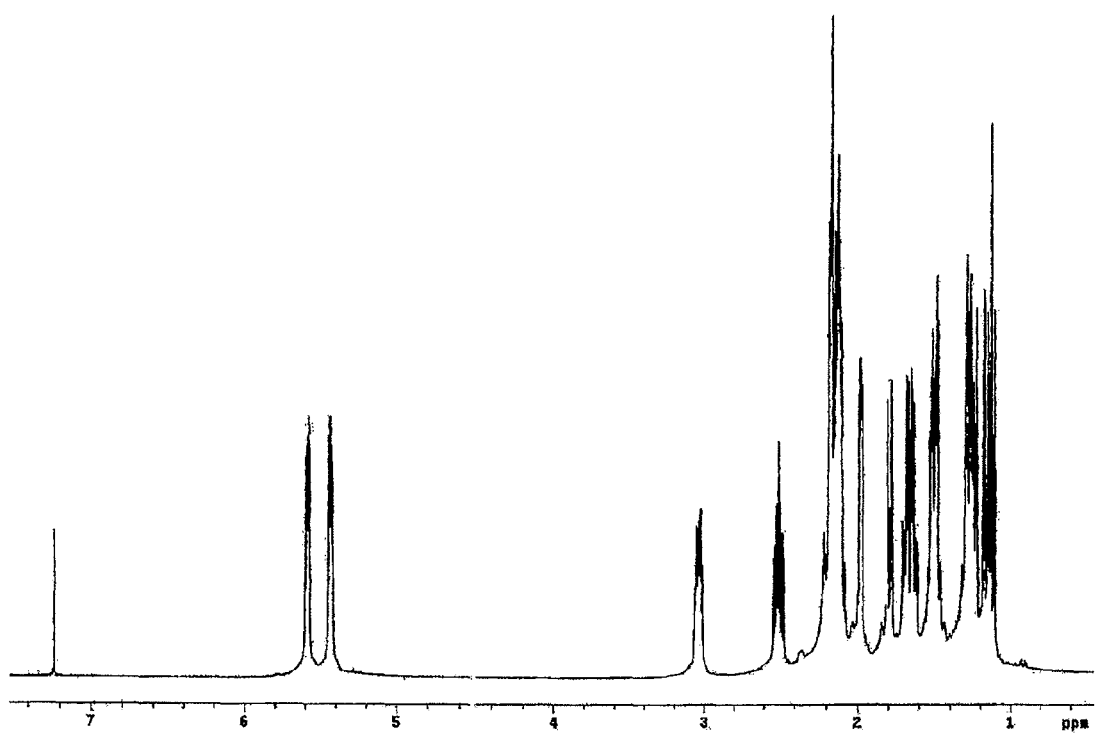
FIG. 10 shows a $^1$H NMR spectrum of a hydrogenated product of Example 16.
Figure 11:
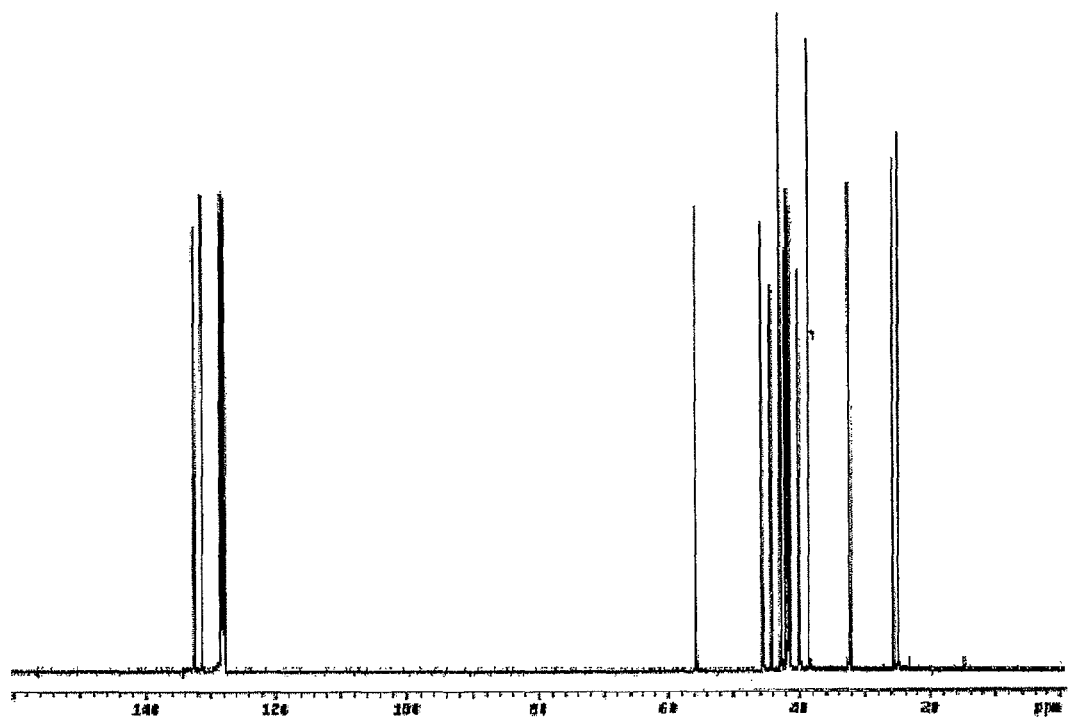
FIG. 11 shows a $^{13}$C NMR spectrum of the hydrogenated product of Example 16.

FIG. 9 shows the $^1$H NMR spectrum of the purely separated tricyclopentadiene compound, FIG. 10 shows the $^1$H NMR spectrum of the hydrogenated compound, and FIG. 11 shows the $^{13}$C NMR spectrum. As shown in FIG. 10 compared with FIG. 9, it can be observed that one peak near 6 ppm showing the norbornene-type olefin group disappears and two peaks near 5.4~5.7 ppm showing the cyclopentene-type olefin group still remain. As seen in the $^{13}$C NMR of FIG. 11, two peaks near 132 ppm showing the cyclopentene-type olefin group's carbons and thirteen peaks near 20~50 ppm showing the aliphatic carbons including the hydrogenated norbornene-type olefin group's carbons can be observed. From this, only the norbornene-type olefin group can be confirmed to be 100% selectively hydrogenated.

Example 17

Tricyclopentadiene (3.2 g, 0.016 mol), the compound (9.1 mg, 0.016 mmol) of Preparation Example 1, and toluene (10 ink) were added into an autoclave and decompressed at −78° C., thus removing air therefrom. The temperature was increased to 25° C., after which a hydrogen pressure of 10 bar was applied, and stirring was performed for 12 hours. The reactor was opened, and the reaction solution was passed through silica gel thus removing the catalyst, after which the solvent was removed using vacuum decompression, giving 3.2 g of a pure compound (yield 100%, selectivity 100%). $^1$H and $^{13}$C NMR analyses showed that the same spectrums as in FIGS. 10 and 11 were obtained.

Example 18

Tricyclopentadiene (70 mg, 0.353 mmol), the compound (2.0 mg, 3.53 μmol) of Preparation Example 2, and deuterated benzene (0.3 ml) were added into an NMR tube and decompressed at −78° C., thus removing air therefrom. The temperature was increased to 25° C., after which hydrogen was applied at atmospheric pressure. After 12 hours, the reaction results were confirmed using NMR. $^1$H and $^{13}$C NMR analyses showed that the same spectrums as in FIGS. 10 and 11 were obtained.

Example 19

Tricyclopentadiene (63 mg, 0.318 mmol), the compound (2.0 mg, 3.17 μmol) of Preparation Example 3, and deuterated benzene (0.3 ml) were added into an NMR tube and decompressed at −78° C., thus removing air therefrom. The temperature was increased to 25° C., after which hydrogen was applied at atmospheric pressure. After 12 hours, the reaction results were confirmed using NMR. ¹H and ¹³C NMR analyses showed that the same spectrums as in FIGS. 10 and 11 were obtained.

Example 20

Dicyclopentadiene (4.6 g, 34.99 mmol), the compound (2 mg, 0.0035 mmol) of Preparation Example 1, and methylene chloride (20 ml) were added into an autoclave and decompressed at −78° C., thus removing air therefrom. The temperature was increased to 25° C., after which a hydrogen pressure of 20 bar was applied, and stirring was performed for 6 hours. The reactor was opened, and the reaction solution was passed through silica gel thus removing the catalyst, after which the solvent was removed using vacuum decompression, giving 4.6 g of a pure compound (yield 100%, selectivity 100%).

Figure 12:
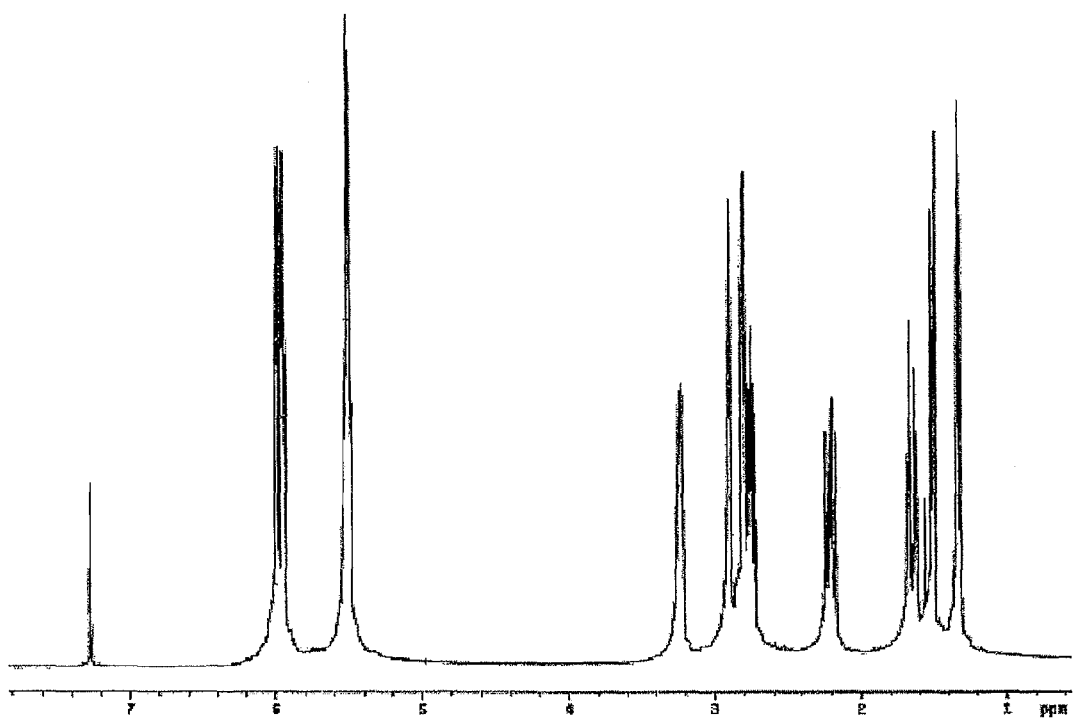
FIG. 12 shows a $^1$H NMR spectrum of dicyclopentadiene before hydrogenation.
Figure 13:
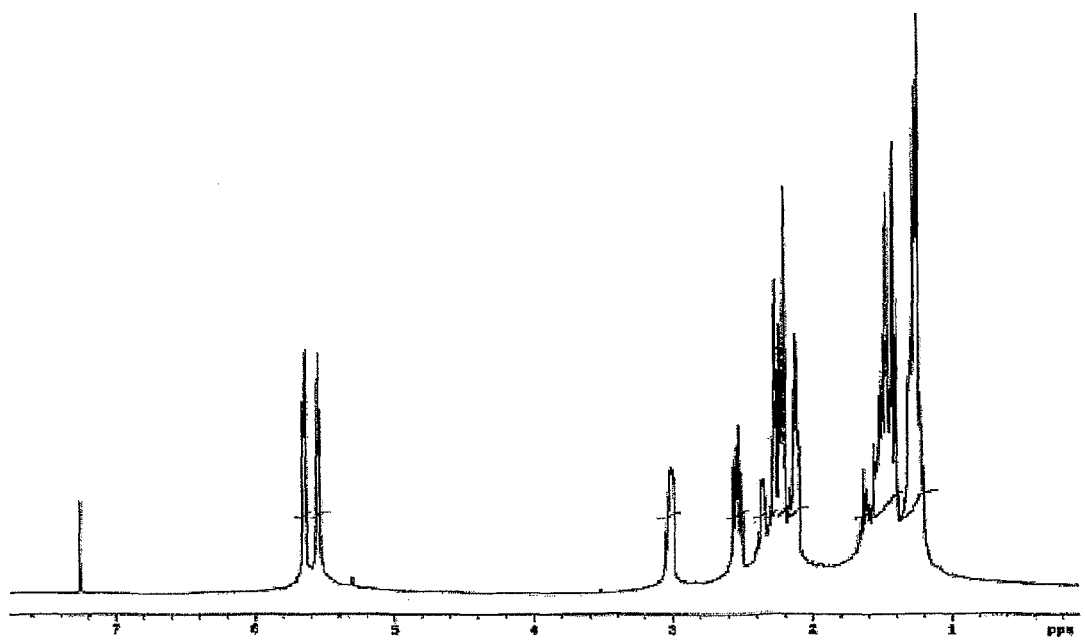
FIG. 13 shows a $^1$H NMR spectrum of a hydrogenated product of Example 20.
Figure 14:
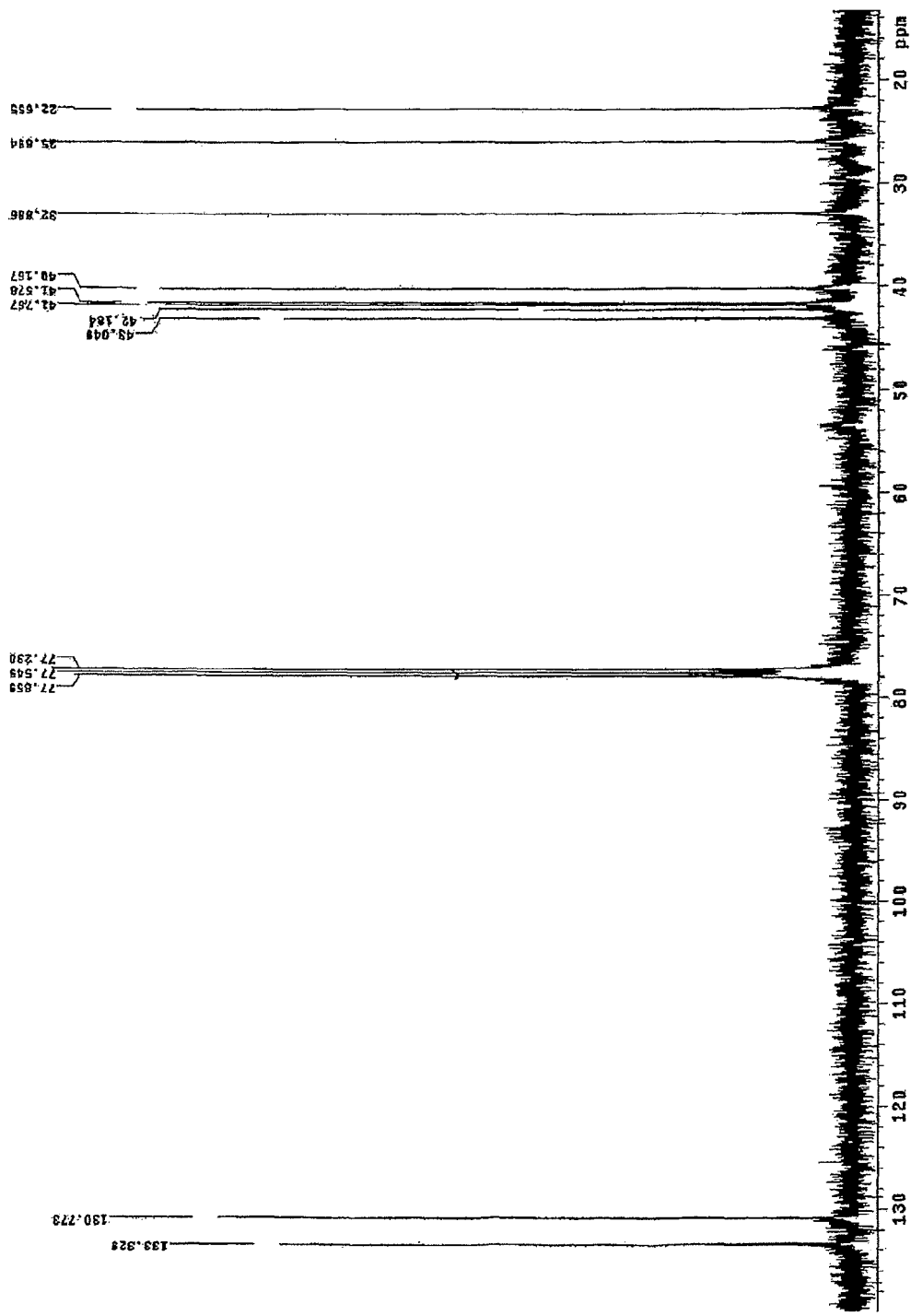
FIG. 14 shows a $^{13}$C NMR spectrum of the hydrogenated product of Example 20.

FIG. 12 shows a ¹H NMR spectrum of commercially available dicyclopentadiene, FIG. 13 shows a ¹H NMR spectrum of the hydrogenated compound, and FIG. 14 shows a ¹³C NMR spectrum. As shown in FIG. 13 compared with FIG. 12, it can be observed that one peak near 5.5 ppm showing the norbornene-type olefin group disappears and peaks near 5.4-5.8 ppm showing the cyclopentene-type olefin group remain. As shown in the ¹³C NMR of FIG. 14, two peaks near 132 ppm showing the cyclopentene-type olefin group's carbons and eight peaks near 20~50 ppm showing aliphatic carbons including the hydrogenated norbornene-type olefin group's carbons can be observed. From this, only the norbornene-type olefin group can be confirmed to be 100% selectively hydrogenated.

Comparative Example 1

Cp₂TiCl₂ (1.1 mg, 4.5 μmol), butyl lithium (2.5 M hexane solution) (12.4 mg, 45 μmol) and tricyclopentadiene (30 mg, 0.15 mmol) were added into an NMR tube in a nitrogen atmosphere, dissolved in deuterated benzene, and decompressed at −78° C., after which hydrogen was fed at room temperature under atmospheric pressure. After 5 hours, the start of hydrogenation of the cyclopentene-type olefin was confirmed to take place before completion of hydrogenation of the norbornene-type olefin group using NMR.

Figure 15:
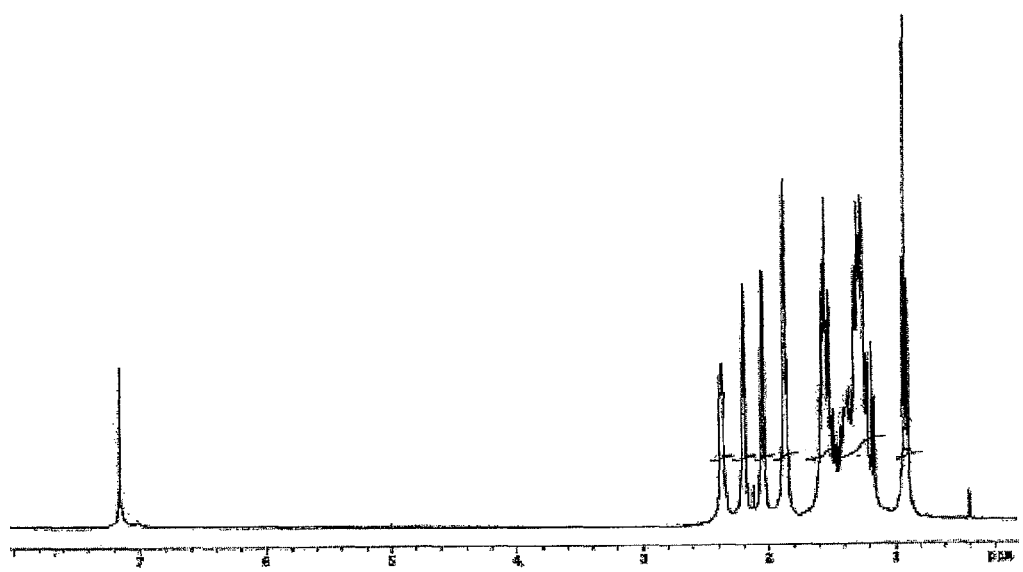
FIG. 15 shows a $^1$H NMR spectrum of a hydrogenated product of Comparative Example 1.

Thus, it can be seen that the two olefin groups simultaneously participate in the hydrogenation from the initial reaction, and after 10 hours, all of the olefin groups are reduced. FIG. 15 shows a ¹H NMR spectrum of the compound in which both of two olefin groups have been reduced.

Comparative Example 2

Rh/Al (16 mg) and tricyclopentadiene (30 mg, 0.15 mmol) were added into an NMR tube in a nitrogen atmosphere, dissolved in deuterated benzene, and decompressed at −78° C., after which hydrogen was fed at room temperature under atmospheric pressure. After 1 hour, the start of hydrogenation of the cyclopentene-type olefin was confirmed to take place before completion of hydrogenation of the norbornene-type olefin group using NMR.

Thus, it can be seen that the two olefin groups simultaneously participate in the hydrogenation from the initial reaction, and after 5 hours, all of the olefin groups are reduced, and thus the same spectrum as the ¹H NMR spectrum of FIG. 15 is obtained.

Comparative Example 3

Pd/C (8 mg, 0.08 mmol) and tricyclopentadiene (30 mg, 0.15 mmol) were added into an NMR tube in a nitrogen atmosphere, dissolved in deuterated benzene, and decompressed at −78° C., after which hydrogen was fed at room temperature under atmospheric pressure. After 1 hour, the start of the hydrogenation of the cyclopentene-type olefin was confirmed to take place before completion of hydrogenation of the norbornene-type olefin group using NMR.

Thus, it can be seen that two olefin groups simultaneously participate in the hydrogenation from the initial reaction, and after 6 hours, all of the olefin groups are reduced, and thus the same spectrum as the ¹H NMR spectrum of FIG. 15 is obtained.

Comparative Example 4

Dicyclopentadiene (4.6 g, 34.99 mmol), Pd/C (500 mg, 4.70 mmol) and methylene chloride (20 ml) were added into an autoclave, and decompressed at −78° C., thus removing air therefrom. The temperature was increased to 25° C., after which a hydrogen pressure of 20 bar was applied and stirring was performed for 2 hours. The reactor was opened, and the reaction solution was passed through silica gel thus removing the catalyst, after which the solvent was removed using vacuum decompression, thus obtaining a pure compound.

Figure 16:
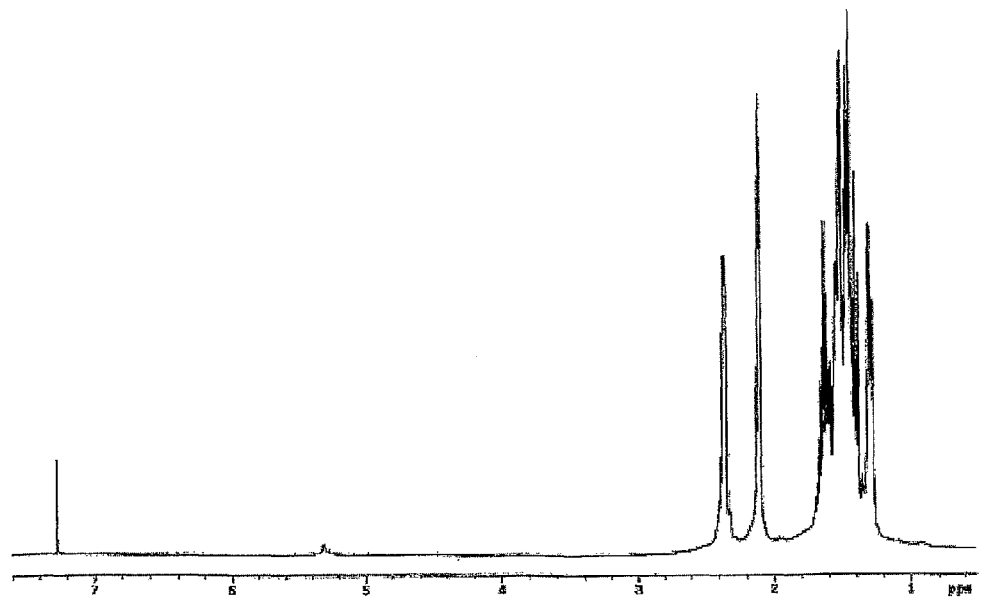
FIG. 16 shows a $^1$H NMR spectrum of a hydrogenated product of Comparative Example 4.

FIG. 16 shows the ¹H NMR spectrum of the compound in which both of the two olefin groups have been reduced.

What is claimed is:

1. A cycloolefin-based polymer compound comprising a repeating unit represented by Formula 7 below:

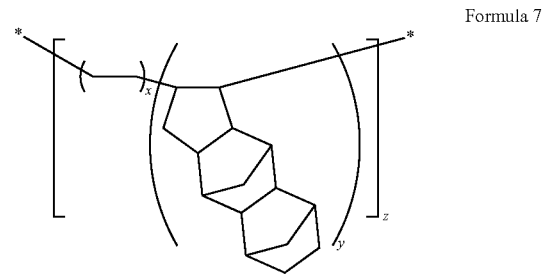

Formula 7 wherein a molar ratio of x:y ranges from 99:1 to 1:99, and z has an average value of 10-20,000.

2. The cycloolefin-based polymer compound as set forth in claim 1, wherein the molar ratio of x:y ranges from 90:10 to 50:50, and z has an average value of 500-3000.

3. A method of preparing a cycloolefin-based polymer compound comprising a repeating unit represented by Formula 7 below, comprising vinyl polymerizing a compound represented by Formula 8 below with ethylene, in presence of a catalyst formed by activating a compound represented by Formula 6 below using a co-catalyst comprising one or more selected from among methylaluminoxane obtained by partially hydrolyzing trimethylaluminum alone or a mixture of trimethylaluminum and triisobutylaluminum, Al(R³)₃ (wherein R³ which are same or different are a halogen radical or a C1-20 hydrocarbyl radical), B(Ar_f)₃ (wherein Ar_f is a fluorine atom-substituted aryl group), and [L]⁺[B(Ar_f)₄]⁻ (wherein Ar_f is defined as above, and [L]⁺ is a carbocation or tert-ammonium):

Formula 7

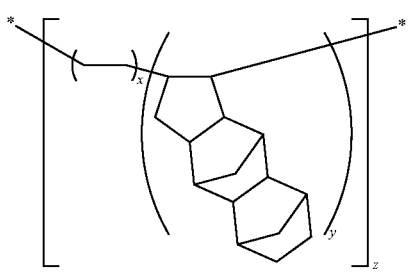

wherein a molar ratio of x:y ranges from 99:1 to 1:99, and z has an average value of 10-20,000;

Formula 6

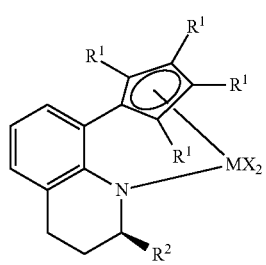

wherein M is Ti, Zr or Hf; X is halogen or a C1-20 alkyl group; $R^1$ which are same or different are a hydrogen radical, a C1-20 alkyl group, an alkenyl group or an alkynyl group; and $R^2$ which are same or different are a hydrogen radical, a C1-20 alkyl group, an alkenyl group or an alkynyl group; and Formula 8

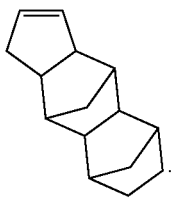

4. The method as set forth in claim 3, wherein in the compound represented by Formula 6, M is Ti, X is a methyl group or a chlorine radical, and both $R^1$ and $R^2$ are a methyl group; in $Al(R^3)_3$, $R^3$ is a methyl group, an ethyl group or an isobutyl group; in $B(Ar_f)_3$, $Ar_f$ is pentafluorophenyl $(C_6F_5)$; and in $[L]^+[B(Ar_f)_4]^-$, $Ar_f$ is pentafluorophenyl $(C_6F_5)$ and $[L]^+$ is $[Ph_3C]^+$ or $[PhNMe_2H]^+$.

5. The method as set forth in claim 3, wherein the compound represented by Formula 8 is obtained by selectively hydrogenating an olefin group of a compound represented by Formula 9 below using an N-heterocyclic-carbene-coordinated palladium compound as a catalyst:

Formula 9

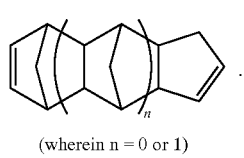

(wherein n = 0 or 1)

6. The method as set forth in claim 5, wherein the N-heterocyclic-carbene-coordinated palladium compound comprises a compound represented by Formula 10 below:

Formula 10

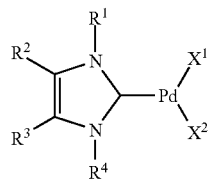

wherein $R^1$ and $R^4$ are independently selected from among C1-20 alkyl and C6-30 aryl groups substituted or unsubstituted with a hetero atom including N, O or S; $R^2$ and $R^3$ are independently selected from among a hydrogen atom, and C1-20 alkyl and C6-30 aryl groups substituted or unsubstituted with a hetero atom including N, O or S; $X^1$ and $X^2$ are independently selected from among a halogen ligand, a substituted or unsubstituted allyl ligand, and a carboxylate ligand, or selected from among an olefin ligand and a solvent ligand; and two compounds are able to be present in dimeric form.

7. The method as set forth in claim 6, wherein the compound represented by Formula 10 is a compound in which both $R^1$ and $R^4$ are 2,6-diisopropylphenyl $(2,6\text{-}iPr_2C_6H_3\text{—})$; both $R^2$ and $R^3$ are a hydrogen atom; and both $X^1$ and $X^2$ are chlorine or acetate, in which case two compounds are able to be present in dimeric form, or one of $X^1$ and $X^2$ is chlorine and the other is allyl.

8. A method of preparing a compound represented by Formula 7 below, comprising selectively hydrogenating an olefin group of a compound represented by Formula II below using an N-heterocyclic-carbene-coordinated palladium compound as a catalyst:

Formula 11

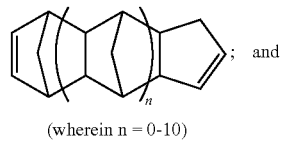 ; and (wherein n = 0-10)

Formula 12

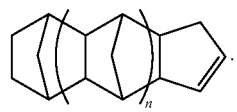

(wherein n = 0-10)

9. The method as set forth in claim 8, wherein the compound represented by Formula 11 and the compound represented by Formula 12 are a compound in which n is 0 or 1.

10. The method as set forth in claim 8, wherein the N-heterocyclic-carbene-coordinated palladium compound comprises a compound represented by Formula 10 below:

Formula 10

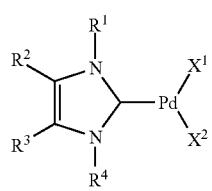

wherein $R^1$ and $R^4$ are independently selected from among C1-20 alkyl and C6-30 aryl groups substituted or unsubstituted with a hetero atom including N, O or S; $R^2$ and $R^3$ are independently selected from among a hydrogen atom, and C1-20 alkyl and C6-30 aryl groups substituted or unsubstituted with a hetero atom including N, O or S; $X^1$ and $X^2$ are independently selected from among a halogen ligand, a substituted or unsubstituted allyl ligand, and a carboxylate ligand, or selected from among an olefin ligand and a solvent ligand; and two compounds are able to be present in dimeric form.

11. The method as set forth in claim 10, wherein the compound represented by Formula 10 is a compound in which both $R^1$ and $R^4$ are 2,6-diisopropylphenyl (2,6-iPr$_2$C$_6$H$_3$—); both $R^2$ and $R^3$ are a hydrogen atom; and both $X^1$ and $X^2$ are chlorine or acetate, in which case two compounds are able to be present in dimeric form, or one of $X^1$ and $X^2$ is chlorine and the other is allyl.

* * * * *